US009904852B2

(12) United States Patent
Divakaran et al.

(10) Patent No.: US 9,904,852 B2
(45) Date of Patent: Feb. 27, 2018

(54) REAL-TIME OBJECT DETECTION, TRACKING AND OCCLUSION REASONING

(71) Applicant: SRI International, Menlo Park, CA (US)

(72) Inventors: Ajay Divakaran, Monmouth Juncation, NJ (US); Qian Yu, Plainsboro, NJ (US); Amir Tamrakar, Philadelphia, PA (US); Harpreet Singh Sawhney, Princeton Junction, NJ (US); Jiejie Zhu, East Windsor, NJ (US); Omar Javed, Franklin Park, NJ (US); Jingen Liu, Plainsboro, NJ (US); Hui Cheng, Bridgewater, NJ (US); Jayakrishnan Eledath, Robbinsville, NJ (US)

(73) Assignee: SRI International, Menlo Park, CA (US)

( * ) Notice: Subject to any disclaimer, the term of this patent is extended or adjusted under 35 U.S.C. 154(b) by 587 days.

(21) Appl. No.: 14/286,305

(22) Filed: May 23, 2014

(65) Prior Publication Data
US 2014/0347475 A1 Nov. 27, 2014

Related U.S. Application Data

(60) Provisional application No. 61/826,515, filed on May 23, 2013, provisional application No. 61/994,334, filed on May 16, 2014, provisional application No. 61/983,479, filed on Apr. 24, 2014.

(51) Int. Cl.
*G06K 9/00* (2006.01)

(52) U.S. Cl.
CPC .............................. *G06K 9/00771* (2013.01)

(58) Field of Classification Search
CPC .................................................. G06K 9/00496
See application file for complete search history.

(56) References Cited

U.S. PATENT DOCUMENTS

| | | | |
|---|---|---|---|
| 7,359,526 B2 | 4/2008 | Nister | |
| 7,359,626 B2 | 4/2008 | McMurdie et al. | |
| 7,613,323 B2 | 11/2009 | Nister et al. | |
| 7,929,017 B2 | 4/2011 | Aggarwal et al. | |
| 7,929,728 B2 | 4/2011 | Guo et al. | |
| 8,289,390 B2 | 10/2012 | Aggarwal et al. | |
| 2009/0002489 A1* | 1/2009 | Yang | G06K 9/00771 348/143 |
| 2010/0208941 A1* | 8/2010 | Broaddus | G01S 3/7864 382/103 |

(Continued)

OTHER PUBLICATIONS

Bo Wu and Ram Nevatia, "Detection and Tracking of Multiple, Partially Occluded Humans by Bayesian Combination of Edgelet based Part Detectors", Dec. 13, 2006, International Journal of Computer Vision.*

(Continued)

*Primary Examiner* — Nam Pham
(74) *Attorney, Agent, or Firm* — Moser Taboada

(57) ABSTRACT

A system for object detection and tracking includes technologies to, among other things, detect and track moving objects, such as pedestrians and/or vehicles, in a real-world environment, handle static and dynamic occlusions, and continue tracking moving objects across the fields of view of multiple different cameras.

43 Claims, 9 Drawing Sheets

(56) References Cited

U.S. PATENT DOCUMENTS

2012/0195460 A1* 8/2012 Lawrence Ashok
 Inigo .................... G06T 19/006
 382/103
2012/0314935 A1 12/2012 Cheng et al.
2014/0258867 A1* 9/2014 Yang .................... G06F 3/0484
 715/723

OTHER PUBLICATIONS

Bansal et al., "Ultra-wide Baseline Facade Matching for Geo-Localization," ECCV 2012 Workshop, 10 pages.
Bansal et al., "Geo-localization of Street Views with Aerial Image Databases," ACM MM Nov. 2011, 4 pages.
Bansal et al., "Joint Spectral Correspondence for Disparate Image Matching," CVPR 2013, 8 pages.
Newcombe et al., "DTAM: Dense Tracking and Mapping in Real-Time," http://www.doc.ic.ac.uk/~ajd/Publications/newcombe_etal_iccv2011.pdf, 2011 IEEE International Conference on Computer Vision (ICCV), Nov. 2011, 8 pages.
Davison et al., "MonoSLAM: Real-Time Single Camera Slam," IEEE Transactions on Pattern Analysis and Machine Intelligence, vol. 29, No. 6, Jun. 2007, 16 pages.
Davison et al., "Real-Time Simultaneous Localisation and Mapping with a Single Camera," Ninth IEEE International Conference on Computer Vision 2003, Oct. 2003, 8 pages.

* cited by examiner

REAL-TIME OBJECT DETECTION, TRACKING AND OCCLUSION REASONING

CROSS-REFERENCES TO RELATED APPLICATIONS

This application claims the benefit of and priority to U.S. Provisional Patent Application Ser. No. 61/994,334, filed May 16, 2014, and U.S. Provisional Patent Application Ser. No. 61/983,479, filed Apr. 24, 2014, and U.S. Provisional Patent Application Ser. No. 61/826,515, filed May 23, 2013, each of which is incorporated herein by this reference in its entirety.

GOVERNMENT RIGHTS

This invention was made in part with government support under contract number DE-AC05-76RL01830 awarded by the United States Department of Energy and contract number N00014-08-C-0339 awarded by the United States Office of Naval Research—Arlington. The United States Government has certain rights in this invention.

BACKGROUND

In computer vision, mathematical techniques are used to detect the presence of and recognize various elements of the visual scenes that are depicted in digital images. Localized portions of an image, known as features, may be used to analyze and classify an image. Low-level features, such as interest points and edges, may be computed from an image and used to detect, for example, people, objects, and landmarks that are depicted in the image. Machine learning algorithms are often used for image recognition.

The ACT-VISION system (Active Coordinated Tracking for Multi-Camera Systems), available from SRI International, is an object tracking system that uses computer vision techniques to detect and track objects depicted in video images, in a multi-camera system. Aspects of the ACT-VISION system are described in U.S. Pat. No. 8,180,107, which is incorporated herein by this reference in its entirety.

Some technologies of SRI International relating to camera calibration, alignment and geo-localization of images are described in, for example, U.S. Patent Application Publication No. 2012/0314935 and U.S. Pat. Nos. 7,359,626 and 7,613,323, each of which is incorporated herein by this reference in its entirety. Other technologies of SRI International relating to pedestrian tracking are described in, for example, U.S. Pat. Nos. 7,929,017; 7,929,728; and 8,289,390.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
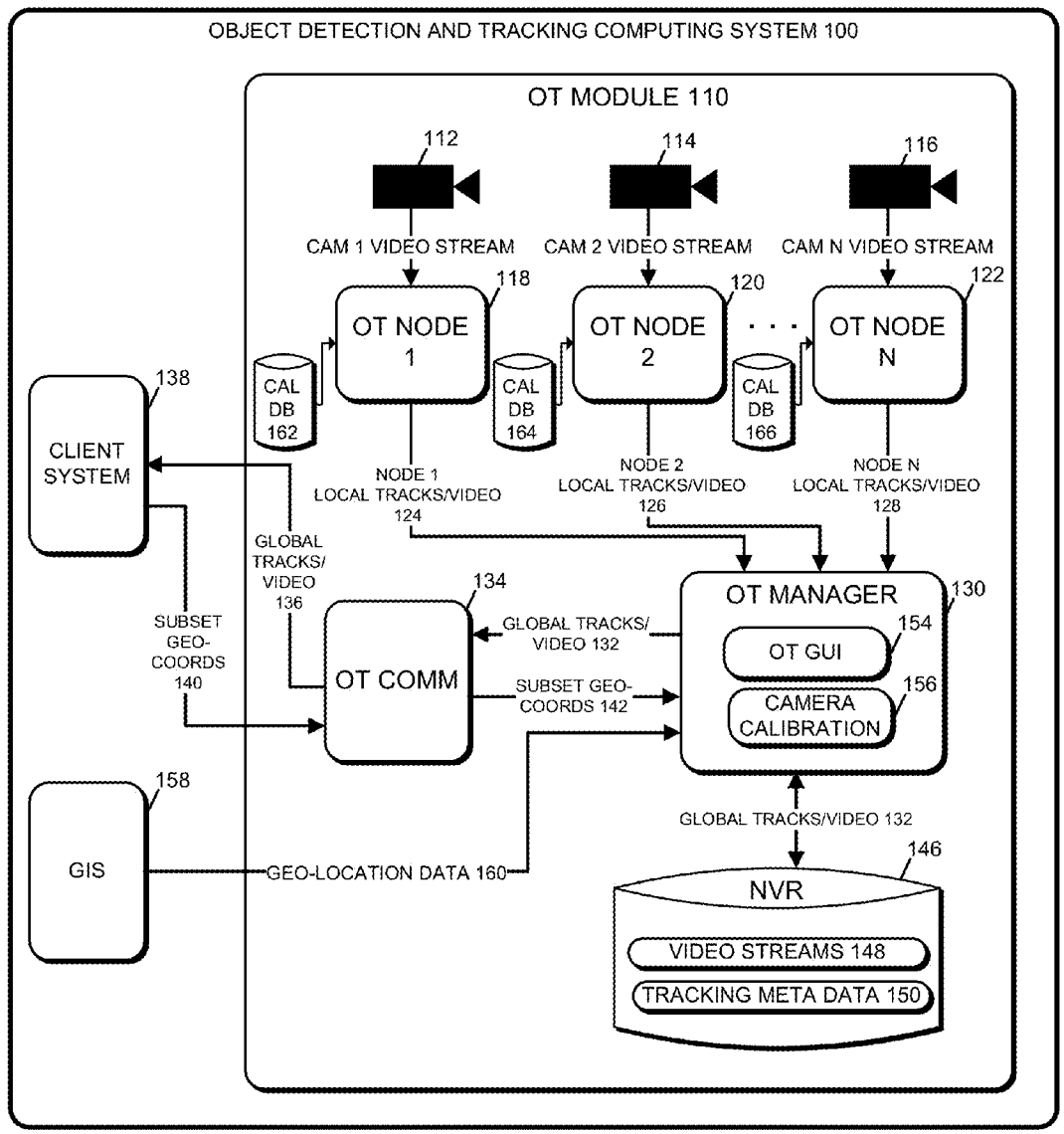
FIG. 1 is a simplified module diagram of at least one embodiment of a computing system for object detection, tracking, and occlusion reasoning as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

Object tracking in a populated area is a challenging problem, due to the need to effectively handle static and dynamic occlusions. Geo-registered human detection and pedestrian tracking in crowds is difficult. Real-time responsiveness and reliability are two highly demanded requirements of object tracking systems that are not easy to achieve. An object detection and tracking system 100 as disclosed herein may be embodied as a computing architecture or framework that, among other things, can enable real-time geo-registered tracking of people and/or objects in groups (such as moderately dense crowds, e.g. at least two or more persons or objects detected in a scene), even with complex occlusions and loss of tracks.

Referring now to FIG. 1, an embodiment of the object detection and tracking computing system 100 is shown in the context of an environment that may be created during the operation of the system 100 (e.g., an execution or "runtime" environment provided by hardware and/or software). The object detection and tracking system 100 executes computer vision algorithms and other mathematical techniques to, among other things, explicitly handle both static and dynamic occlusion in a unified, automated manner. The system 100 is embodied as a number of computer-executable modules, components, and/or data structures, including an object tracking (OT) module 110. Portions of the OT module 110 are designed to, among other things: enable object detection and tracking by individual cameras (e.g., video cameras 112, 114, 116), coordinate handoffs between multiple cameras (e.g., by OT nodes 118, 120, 122 interfacing with an OT manager 130), provide networked interfaces with other systems (such as a client system 138, e.g., via an OT communication subsystem 134), and provide networked video recording (NVR) and playback (using, e.g., an NVR system 146 and an OT graphical user interface (GUI) 154). As used herein, "object" may refer to, among other things, people and/or objects; for instance, pedestrians and/or movable objects whose activity is capable of being tracked, e.g., people or items that are capable of changing location or position relative to a reference position, a reference location, or another person or object. For example, the term "object" may be used herein to refer to a person, an object, or a combination of a person and an object (e.g., a person riding in a car or a person carrying an object). Similarly, where the description refers to a person, human, people, or similar terminology, it should be appreciated that aspects of the description may also be applicable to the detection and tracking of other types of objects.

The OT module 110 includes an expandable number of OT nodes 118, 120, 122 (e.g., "N" nodes, where N is a positive integer), each of which receives and processes video output of a camera 112, 114, 116 as described further below. The OT nodes 118, 120, 122 each output a number of local tracks/video 124, 126, 128, respectively. The local tracks/video 124, 126, 128 are processed by the OT manager module 130 as described in more detail below. As used herein, "local track" or "local track/video" may refer to, among other things, a video stream that is annotated (e.g., with meta tags and/or markings) or otherwise associated with information that uniquely identifies one or more objects detected in the video stream and the geographic location (e.g., Universal Transverse Mercator coordinates, latitude/longitude, or other geo-coordinates) of the identified object(s) at each time instant of the video stream (e.g., for each frame/image in the video stream). For example, each OT node 118, 120, 122 may output a different local track for each object that is detected and tracked in the video stream that the OT node 118, 120, 122 receives from a camera. That is, each local track may only contain tracking information for a single object depicted in a video stream output by a single camera. As used herein, a "camera" may refer to any device that is capable of acquiring and recording two-dimensional (2D) or three-dimensional (3D) video images of portions of the real-world environment, and may include cameras with one or more fixed camera parameters and/or cameras having one or more variable parameters, fixed-location cameras (such as "stand-off" cameras that are installed in ceilings, on buildings, or on light poles, for security or surveillance purposes), and/or mobile cameras (such as cameras that are integrated with mobile electronic devices, such as smart phones, tablet computers, wearable electronic devices, aerial vehicles (AVs), unmanned aerial vehicles (UAVs), robots, and/or others).

Figure 2:
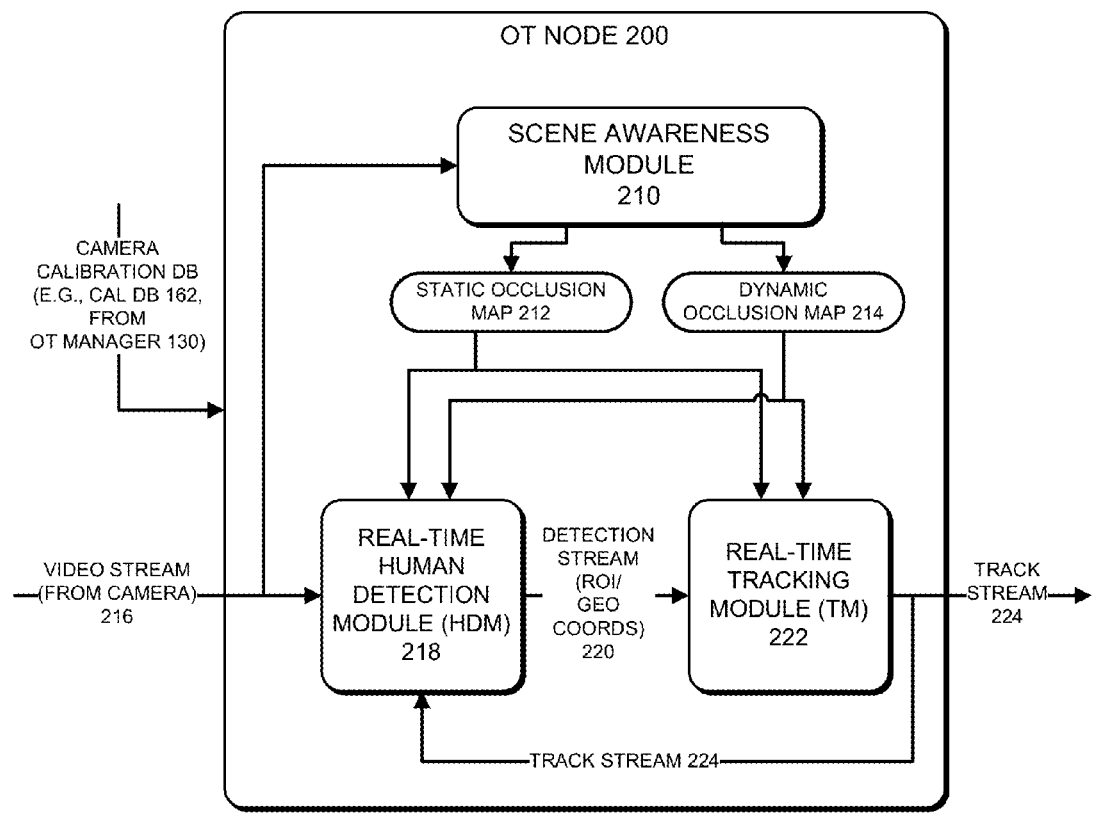
FIG. 2 is a simplified module diagram of at least one embodiment of an object tracking node of FIG. 1.

Each of the OT nodes 118, 120, 122 includes a number of subcomponents that operate to provide the object detection and tracking capabilities disclosed herein within the field of view (FOV) of a single camera system (e.g., one of the cameras 112, 114, 116). An embodiment of these subcomponents is shown in FIG. 2, described below. As used herein, "field of view" may refer to, among other things, the extent of the observable real world that is visible through a camera at any given moment in time. The field of view may depend on, for example, the particular position and spatial orientation of the camera, the focal length of the camera lens (which may be variable, in some embodiments), the size of the optical sensor, and/or other factors, at any given time instance. Objects that are outside a camera's FOV at the time that a video is recorded are not depicted in the video stream.

As an object moves across the FOV of the multiple cameras 112, 114, 116, each corresponding OT node 118, 120, 122 produces the local tracks/videos 124, 126, 128 within the FOV of its respective camera 112, 114, 116. The OT manager 130 maps the local tracks/video 124, 126, 128 generated by the OT nodes 118, 120, 122 for each detected object to a single global track/video 132 for the tracked object. To do this, the OT manager 130 fuses the local tracks/video 124, 126, 128 for the tracked object across all of the FOVs in a process called camera-to-camera handoff, which is described in more detail below. The OT comm subsystem 134 operates as an interface between the OT module 110 and one or more external systems, such as the client system 138. In the illustrative embodiment, the OT comm subsystem 134 converts the global tracks/video 132 and/or other data to a form that can be read by the client system 138 (e.g., global tracks/video 136). Similarly, the OT comm subsystem 134 converts subset geo-coordinates (e.g., UTM or longitude/latitude coordinates) 140 and/or other data received from the client system 138 to a form that can be read by the OT manager 130 (e.g., subset geo-coordinates 142). The geographic information service (GIS) 158 provides geo-location data 160 to the OT manager 130 for use by the OT manager 130 and the OT nodes 118, 120, 122 in generating the local and global tracks. Portions of the GIS 158 may be embodied as a publicly accessible GIS or mapping service, such as GOOGLE MAPS. The network video recorder 146 stores the global tracks/video 132 that are created by the OT manager 130 based on the local tracks/video provided by the OT nodes 118, 120, 122. Illustratively, the NVR 146 stores the global tracks/video 132 as video streams 148 and tracking metadata 150. The NVR 146 may be embodied as a searchable database or other suitable data structure configured for querying, playback, and/or other uses.

The illustrative OT manager 130 is embodied as a number of computer-executable modules, components, and/or data structures, including an OT GUI 154 and a camera calibration module 156, which operate to provide the object detection and tracking capabilities disclosed herein across the fields of view of the cameras that are registered with the system, by creating global tracks/video 132 from the local tracks/video 124, 126, 128. To do this, each local track/video 124, 126, 128 processed by the OT manager 130 is assigned a system-wide unique identifier (ID). The local track ID may be assigned to the local track by the OT node 118, 120, 122 that generated the local track, or by the OT manager 130 upon receiving the local track from the OT node, for example. When an object is initially detected and tracking of the detected object is first initiated by an OT node 118, 120, 122, the OT manager 130 assigns a global ID to the detected object's initial local track such that the global ID is the same as the object's initial local ID. When the object enters the FOV of a second (different) camera 112, 114, 116, the object is assigned a new (different) local ID by the second OT node (such that now, there are two local tracks for the object, each having a different local ID). The OT manager 130 may determine that the two local tracks received from the two different OT nodes correspond to the same object. Once the OT manager 130 determines that a set of local tracks are all associated with the same tracked object, the OT manager 130 assigns the same global ID to all of the local tracks in the set, in order to link the local tracks to one another. This operation performed by the OT manager 130 may be referred to as "handoff."

The OT manager 130 can use various techniques to determine that local tracks received from different OT nodes correspond to the same object. For example, the OT manager 130 can link two local tracks of the same object in the presence of an occlusion, through the use of occlusion zones as described below. Additionally or alternatively, the OT manager 130 can perform handoff with or without overlapping FOVs. In the latter case, the OT manager 130 treats blind spots (e.g., regions that are not visible to either of the two cameras involved in the handoff) as occlusion zones and a reacquisition module 610, described below with reference to FIG. 6, may be used to reacquire the tracks.

To accomplish track handoff with FOV overlap, the illustrative OT manager 130 may use the geo-coordinates of the tracked objects as well as appearance models 616 (described below) of the tracked objects to associate a pair of local tracks with one another during the time in which the object is within the overlapping FOV of the two cameras. The Joint-Probabilistic Data Association (JPDA) algorithm may be used to solve for the assignments between all of the local tracks. The JPDA can also produce fused track geo-locations in the overlapping zone so that only one set of geo-locations are reported globally.

When an object's track straddles across non-overlapping fields of view, camera-to-camera handoff can be mediated by the use of motion and appearance cues. The blind spots of the system 100 can be treated as occlusion zones. When an object appears in the FOV of a different camera, a new track is initiated but the OT manager 130 tests the hypothesis that the new track may be a continuation of a previously-initiated track in another camera's FOV. The OT manager 130 in this scenario can employ Multi-Hypotheses Tracking (MHT) to associate ambiguous track continuations with existing tracks. Motion constraints can be used to filter tracks that are potential candidates for association. Appearance matching can be applied to the filtered tracks. When motion and appearance cues result in unambiguous tracks, the OT manager 130 can create unique track continuations. In ambiguous track situations, the system 100 can use the MHT to allow multiple track possibilities to exist, while selecting and reporting only the mathematically-determined "best" or optimal track continuation (e.g., as a track stream 132). As used herein, a "hypothesis" or "inference" may refer to, among other things, output resulting from the execution by the computing system 100 of one or more computer vision algorithms or other mathematical techniques (e.g., inference reasoning and/or other artificial intelligence-based techniques) for detecting features (such as foreground, background, people, objects, etc.) in an image. For example, a hypothesis (or inference) may have associated with it a degree of certainty, such as a statistical or probabilistic likelihood that the hypothesis (or inference) is correct. The degree of certainty may depend on variables such as camera parameters, environmental parameters (e.g., lighting, scene complexity, etc.), algorithm(s) used, feature type, similarity of the detected feature to a training data set, and/or other factors.

The illustrative OT manager 130 can use geo-location data 160 received from the GIS 158 to compute geo-locations of tracked humans and objects by, for example, back-projecting into the 3D world a reference location on a 2D region-of-interest of the detected human or object. The geo-location data 160 may include, for example, satellite imagery of a geographic region of interest, such as the field of view of each of the cameras 112, 114, 116. The OT manager 130 may use, for example, camera-to-world pose transformations, which may be obtained through camera calibration performed by a camera calibration module 156, e.g., during system installation and setup. The camera calibration module 156 may, for each of the cameras 112, 114, 116, compute the 3D pose transformation between the camera and one or more 3D real-world coordinates as determined from the geo-location data 160. Alternatively, the camera calibration module 156 may use a homology-based camera calibration approach for either monocular or stereo camera implementations of the cameras 112, 114, 116. The calibration data produced by the camera calibration module 156 for each of the cameras 112, 114, 116 is, illustratively, stored in a corresponding calibration database 162, 164, 166. The OT nodes 118, 120, 122 utilize the calibration databases 162, 164, 166, respectively, to generate the local tracks/video 124, 126, 128.

Using the camera calibrations produced by the camera calibration module 156 and an assumption that people are located on the ground plane, there are multiple ways by which the OT nodes 118, 120, 122 may compute geo-locations of people that are detected in the video streams, such as by directly mapping foot locations to the ground plane using a homography. Another option is to use top of the head in the image plane, and under the assumption of a nominal height (say 1.8 m), map the head to the feet location in 3D. Yet another option is to detect the centroid of the person and geo-locate the person's feet by back-projecting the centroid. The localization accuracy can be further improved in tracking by using, for example, a kinematics model and smoothness term. By visually co-browsing the tracks of the people detected in the video stream and the mapped tracks on the ground, the system 100 can localize the geo-located tracks with greater accuracy.

Referring now in more detail to the OT comm module 134, some embodiments of the illustrative OT comm module 134 include two sub-modules: one for interfacing with the client system 138, and another for sending out the geo-location data stream, e.g., the global tracks/video 136. In the illustrative embodiment, the client system 138 uses the OT module 134 as a service to provide subset tracking capabilities as described further below. In other embodiments, the system 100 may interface with a number of other types of client systems, either through the OT comm module 134 or other methods.

Communication between the client system 138 and the OT comm module 134 may be established using an OT application programming interface (API) of the client system 138 to communicate with location sensors and transmit subset geo-coordinates 140 to the OT module 110 for the purpose of subset tracking, where the subset tracking may involve the tracking of groups of people triggered by detection of at least one of the tracked persons in a region of interest specified by the subset geo-coordinates 140. The OT API may use, for example, a Simple Object Access Protocol (SOAP) interface to the OT comm module 134 to send the subset or region of interest geo-coordinate data 142 to the OT module 110. The SOAP is an Extensible Markup Language (XML)-based protocol that supports remote procedure calls (RPC) and message semantics. To do this, the OT API may query the state of the OT module 110 for readiness and then transmit the geo-coordinates 142 to the OT manager 130 to start track initiation. In some embodiments, a Software Development Kit (SDK) may be provided with the system 100, in order to facilitate the development of applications (such as the client system 138) for communicating with the OT module 110. The SDK may include, for example, an OT API library (static and/or dynamic library and an example application (e.g., in Microsoft Visual C++), among other things.

Referring now in more detail to the OT GUI 154, the OT GUI 154 may be embodied as any suitable form of human-computer interface, such as a user interface for a workstation display, with which an operator may interact using a computer keyboard, keypad, touchscreen, mouse device, microphone, and/or other form of interactive device. The OT GUI 154 may display a 3D model of the real-world location filmed by one or more of the cameras 112, 114, 116, and may include graphical depictions, such as avatars, identifying the people or objects being tracked in the scene. The live video streams generated by the cameras 112, 114, 116 may be geo-registered to the 3D model scene that is displayed by the OT GUI 154 to provide direct correlation between camera capture and tracking activities in real time. The display of people or objects being tracked may be highlighted by the OT GUI 154 with colored boxes or other markings that move in concert with the real time movement of the tracked person or object. A database such as PostGIS (an open-source software program certified by the Open Geospatial Consortium) or Cisco Media Server may be used to store global tracks and video 132 in the NVR 146.

Referring now to FIG. 2, an embodiment 200 of one or more of the OT nodes 118, 120, 122 is shown in greater detail, in the context of an environment that may be created during the operation of the system 100 (e.g., an execution or "runtime" environment). The illustrative OT node 200 and portions thereof are embodied as a number of computer-executable modules, components, and/or data structures, including a scene awareness module (SAM) 210, a static occlusion map 212, a dynamic occlusion map 214, a real-time human detection module (HDM) 218, and a real-time tracking module (TM) 222. The illustrative OT node 200 detects humans and tracks them within the FOV of a single camera (e.g., a camera 112, 114, 116).

The OT node 200 receives a video stream from its associated camera 112, 114, or 116, and uses its respective camera calibration database (e.g., calibration db 162, 164, or 166) to generate and output a track stream 224 (e.g., a local track/video 124, 126, or 128). The track stream 224 contains unique IDs for each individual being tracked by the system 100, as well as the person's position at each time instant in geo-coordinates (e.g., UTM or latitude/longitude). While aspects of the OT node 200 are described in the context of the tracking of humans, it should be understood that aspects of the OT node 200's functionality are equally applicable to the tracking of persons and other objects. For instance, other embodiments of the OT node 200 may track various other types of objects, such as vehicles, using techniques similar to those described herein.

The illustrative scene awareness module 210 maintains static and dynamic occlusion maps 212, 214 for the FOV of the camera with which the OT node 200 is associated. As such, the static and dynamic occlusion maps 212, 214 may be specific to a particular camera's FOV. The illustrative human detection module 218 executes one or more human detection computer vision algorithms on each frame of the video stream 216. The video stream 216 depicts the real-world scene in the FOV of the camera associated with the OT node 200, as mentioned above. The human detection module 218 relays the geo-positions of any detected persons as well as any regions-of-interest (ROIs) of the detected person(s) in each of the individual image/frames to the real-time tracking module 222, as a detection stream 220.

Whereas the human detection module 218 analyzes the individual frames of the video stream 216 for detection purposes, the tracking module 222 analyzes temporal sequences of frames in the video stream 216 in order to track the movement of detected persons or objects over time. To do this, the tracking module 222 initiates and maintains a local track stream 224 for each of the individuals that are detected by the human detection module 218. The local track streams 224 are output to the OT manager 130 (e.g., as local tracks/video 124, 126, or 128) and are also fed back to the human detection module 218 for use by the human detectors (described below) of the human detection module 218 in analyzing the next frame of the video stream 216. The components 210, 212, 214, 218, 222 of the OT node 200 are each described in greater detail below.

The illustrative scene awareness module 210 computes static and dynamic occlusion regions in the individual frames of the video stream 216 (which depicts the real-world environment in a field of view of a camera 112, 114, 116), and generates the static and dynamic occlusion maps 212, 214, accordingly. The static and dynamic occlusion maps 212, 214 are used by both the human detection module 218 and the tracking module 222. To generate the static and dynamic occlusion maps 212, 214, the scene awareness module 210 performs static and dynamic occlusion modeling. During static modeling, static occluders (such as poles and trees) detected in the scene are marked with static masks using a distinguishing color (e.g., orange), and dynamic occluders (such as vehicles) are marked with dynamic masks in a different distinguishing color (e.g., cyan). The scene awareness module 210 executes a projective transformation to map the static and dynamic masks from the image to the ground plane to create static and dynamic occlusion zones in geo-space. The static and/or dynamic occlusion zones may include personal occlusion zones, as described below. The occlusion zones detected and mapped by the scene awareness module 210 are used in occlusion reasoning for both detection and tracking, as described further below. As used herein, "mask" may refer to, among other things, a computer-synthesized graphic or other marking, such as a differently-colored block or region, which can be applied to or overlayed on an image in a video stream in order to identify a portion of the image as, for example, a part of the background, a part of the foreground, a person, a person's body part, an object, or a part of an object.

In some embodiments, the scene awareness module 210 may generate the static masks based on manual input, which may be provided by, for example, a system operator. Such manual input may be obtained for each camera's field of view during initial calibration of the camera performed by the calibration module 156. For example, the calibration module 156 may interface with the OT GUI 154 in order to obtain the manual input. For example, once a camera's field of view is determined, a system operator or other system user may create the static masks based on static occluders that are detected in the field of view. Alternatively, the scene awareness module 210 can learn static masks by applying one or more machine learning techniques to tracking data output by the tracking module 222 (e.g., the track stream 224) over time (e.g., training data). For example, if at a certain geographic location, occlusions are consistently detected by the system 100 (or observed by a system operator) over a period of time, the scene awareness module 210 may develop a static mask for the consistently-observed occlusions at that location. The static masks generally remain unchanged unless the camera is moved or re-positioned. To create the dynamic masks, the scene awareness module 210 estimates the dynamic masks for every frame of the video stream 216 using background modeling, which is described further below with reference to FIG. 3. In some embodiments, the system 100 can be initialized or "bootstrapped" with dynamic masks, if static masks are not available or for other reasons.

Figure 3:
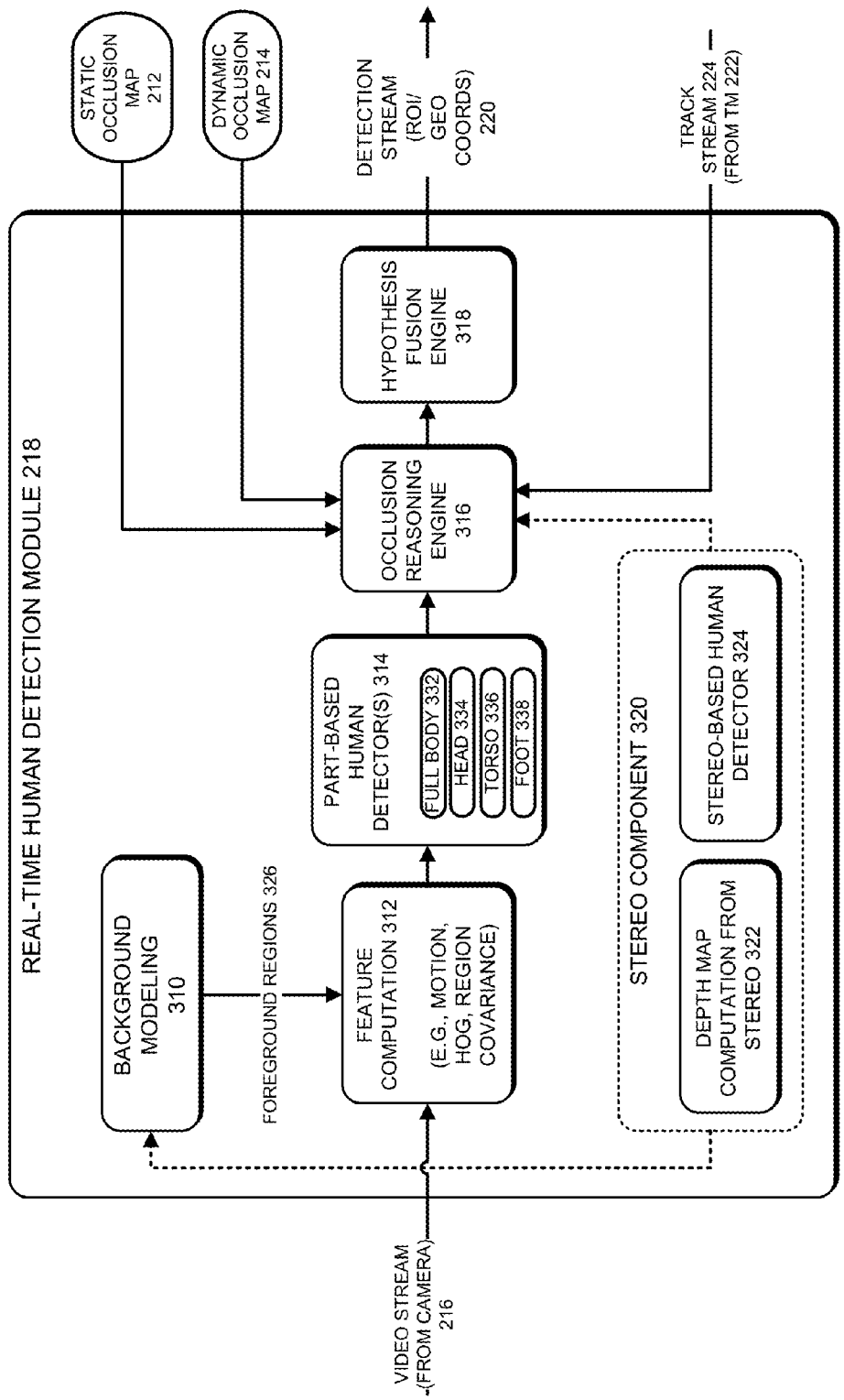
FIG. 3 is a simplified module diagram of at least one embodiment of the real-time human detection module of FIG. 2.

Referring now to FIG. 3, an embodiment of the human detection module 218 is shown in greater detail, in the context of an environment that may be created during the operation of the system 100 (e.g., an execution or "runtime" environment). The illustrative human detection module 218 and portions thereof are embodied as a number of computer-executable modules, components, and/or data structures, including a background modeling module 310, a feature computation module 312, one or more part-based human detectors 314 (including, for example, a full body detector 332, a head detector 334, a torso detector 336, and a foot detector 338), an occlusion reasoning engine 316, and a hypothesis fusion engine 318. The human detection module 218 can operate with video stream input 216 from a monocular or stereo camera system. As such, some embodiments of the human detection module 218 may include a stereo component 320, which may include a depth map computation module 322 to compute a depth map using video streams from multiple cameras (e.g., a pair of cameras arranged in a vertically aligned configuration), and a stereo-based human detector 324 to improve human detection by fusing detections from the multiple cameras in 3D. While aspects of human detection module 218 are described in the context of the tracking of humans, it should be understood that aspects of the human detection module 218's functionality are equally applicable to the tracking of persons and other objects. For instance, to track vehicles, the part based detectors 314 may include full vehicle, wheel, fender, window, and bumper detectors alternatively or in addition to full body, head, torso and foot detectors.

A background modeling module 310 of the human detection module 218 uses the input video stream 216 to create a background model of the largely static portions of the scene depicted in the video stream 216 (which corresponds to the real world environment that is within the field of view of the camera). For mobile cameras that are in motion (e.g., mobile phone or wearable device cameras), the system 100 may account for the camera movement using algorithmic pose estimation techniques, such as those described in U.S. Pat. Nos. 7,359,526 and 7,613,323. Further, the background modeling module 310 can account for camera shaking due to wind, vibrations, or other movement by executing one or more video stabilization algorithms to filter out image motions. The illustrative background modeling module 310 employs one or more non-parametric distributions to model a detected object's appearance at each pixel, and thereby can account for extraneous motions such as trees and flags swaying. Hypothesized regions of foreground 326, such as those corresponding to humans and vehicles, are detected by the background modeling module 310 as outliers with respect to the background model. The background modeling module 310 may generate foreground masks based on these outliers (hypothesized regions of foreground), which may be used to restrict subsequent feature computations to only those masked regions (in order to improve computational performance or for other reasons). While not specifically shown, it should be understood that the background model and masks that are generated by the background modeling module 310 may be stored in computer memory, e.g., using one or more data storage devices 1118, 1178 shown in FIG. 11, described below.

The foreground regions 326 produced by the background modeling module 310 and the input video stream 216 are used by the feature computation module 312 to generate hypotheses of human forms and/or the spatial arrangement of parts of the human forms depicted in the video stream 216. To do this, the feature computation module 312 executes multiple types of object detection feature descriptors, including, for example, motion, Edgelet, Histogram of Oriented Gradients (HoG), and region covariances. The human detection hypotheses generated by the feature computation module 312 are analyzed by the one or more part-based human detectors 314 to further verify the presence and infer the spatial arrangement of human forms and/or the spatial arrangement of parts of the human forms in the video stream 216, as described further below. The output of the part-based detectors 314 is passed to the occlusion reasoning engine 316, which executes algorithms for further resolving the spatial arrangement of human forms or parts of human forms under occlusion, to further resolve the location and position of human forms and parts of human forms that are detected in the video stream 216 relative to one another. For example, where the human detection module 218 detects many instances of the same body part in an image, the occlusion reasoning engine 316 may resolve the assignments of the body parts to the appropriate persons detected in the image or resolve connections of body parts to other body parts of the same person, where such connections between body parts may be occluded by an at least temporary (e.g., static or dynamic) occlusion.

In embodiments of the system 100 that include the stereo component 320 (e.g., to accommodate stereo cameras), the occlusion reasoning engine 316 may receive output resulting from the execution of the depth map computation module 322 and the stereo-based human detector 324. The human detection hypotheses output by the stereo-based human detector 324 and the part-based human detector(s) 314 are input to the hypotheses fusion engine 318, which generates regions of interest (ROIs) and geo-coordinates of the detected human forms.

Referring now in more detail to the feature computation module 312, the illustrative feature computation module 312 utilizes a combination of different feature descriptors, although other embodiments of the feature computation module 312 may use only a single feature descriptor. Numerous image feature descriptors have been developed for robust human detection, such as gradient-based features, block-based features, and motion features. In some cases, a single type of feature may be limited in its discriminative ability to separate humans from non-humans. Therefore, in some embodiments, the feature computation module 312 uses a combination of different feature descriptors that includes at least one feature descriptor that is considered to have greater discriminative power but lower computational efficiency, at least one feature descriptor that provides greater computational efficiency but less discriminative power, and at least one feature descriptor that provides approximately equal degrees of computational efficiency and discriminative power. In some embodiments, the feature computation module 312 executes three feature descriptors, namely, the edgelet feature, the HOG descriptor and the covariance descriptor.

Figure 4A:
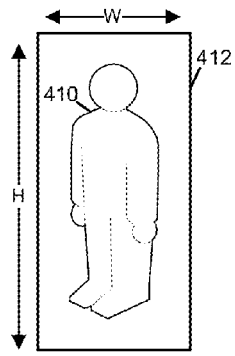
FIGS. 4A-4D are examples of components of a part-based human detector as disclosed herein.
Figure 4B:
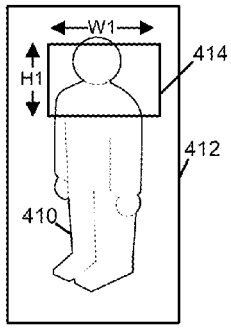
Figure 4C:
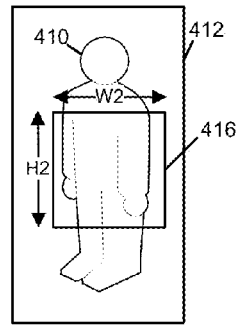
Figure 4D:
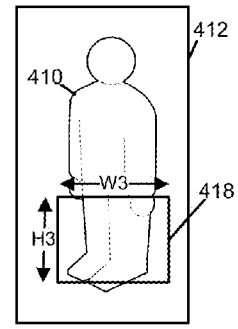

Referring now in more detail to the part-based human detector(s) 314 and the occlusion reasoning engine 316, some embodiments of the human detection module 218 utilize a cascade structured classifier for human detection and for the detection of other feature types. In conjunction with the detection of multiple feature types, a number of part-based detectors 314 are used to deal with temporary and/or partial occlusions. As used herein, "temporary and/or partial" may refer to, among other things, a temporary (e.g., dynamic) and full or complete occlusion, or a permanent (e.g., static) and partial occlusion, or a temporary and partial occlusion. FIGS. 4A-4D show example configurations of the illustrative part-based human detectors 314. FIG. 4A shows an example of output of the full-body detector 332, which is configured to detect a full body 410 of a person in an image based on assumed dimensions of the full human body (where H=height, W=width). If a full body is detected, the full-body detector 332 applies a marking 412 (e.g., a detection window or bounding box) to the image to indicate the full body detection. In the illustration, the marking 412 includes a box that surrounds the detected full body. FIG. 4B is an example of output of the head detector 334, which is configured to detect the head of a person independently of other parts of the full human body, based on assumed dimensions of the human head, which may be defined absolutely or relative to the dimensions of the full body. In the example, the marking 414 output by the head detector 334 is defined by dimensions H1 and W1, where H1 is less than H and W1 is less than or equal to W. The dimensions H and W, etc., may be defined in terms of pixel coordinates, for example. The head detection bounding box 414 may align with or overlay a top portion of the full body marking 412, in some embodiments. FIG. 4C shows an example of output of the torso detector 336, which is configured to detect the torso of a person independently of other parts of the full human body. The bounding box 416 output by the illustrative torso detector 336 has dimensions H2 and W2, which may be specified absolutely (e.g., by pixel coordinates) or as a function of the dimensions H and W, respectively. In the example, the torso detector bounding box 416 is offset from the top of the full body marking 412 by a fraction of the full body height. The output of the torso detector 336 may align with or overlay a middle portion of the full body marking 412, in some embodiments. FIG. 4D is an example of output of the lower body, leg, and/or foot detector 338, which is configured to detect the lower body, legs, and/or feet of a person independently of other parts of the full human body, based on assumed dimensions of the lower body, legs, and/or feet, H3 and W3, which may be specified absolutely or relative to the dimensions of the full human body. For example, H3 may be defined as a fraction of the full body height H. The bounding box 418 output by the lower body, leg, and/or foot detector 338 may align with or overlay a lower portion of the full body marking 412, in some embodiments. As used herein, "detection window," "bounding box," or "marking" may be used to refer to a region within an image in which an object or a portion of an object is detected or is expected to be detected. As an example, a graphical marking (such as a rectangular box) may be applied to an image to define a detection window. In some cases, the marking used to define the bounding box may indicate the degree of confidence that the system 100 has in the detection. For instance, a bounding box that is drawn with dashed lines may indicate a lower level of confidence in the detection hypothesis than a bounding box drawn with a solid line.

The human detection module 218 combines the output of the part-based detectors 314 (e.g., one or more of the full body, head, torso, and leg detectors 332, 334, 336, 338) to produce a human detector that can, among other things, more robustly detect occluded humans. When a detected person is temporarily and/or partially occluded in a frame of the video stream 216, it may not be possible for the system 100 to detect all of the person's body parts. Further, when the occlusion results from the presence of another person (as may be the case when people are walking together in a group), the body parts of multiple people may appear to overlap and it may be difficult to tell which body parts belong to which of the persons in the group.

The occlusion reasoning engine 316 applies the static and dynamic occlusion maps 212, 214 and the track stream 224 fed back from the tracking module 222 to the output of the part based human detector(s) 314 and the output of the stereo component 320, if available. With these inputs, the occlusion reasoning engine 316 explicitly reasons about the occlusion of the various body parts detected by the part-based detectors 314 by jointly considering all of the part detections produced by all of the detectors of persons and/or body parts. The occlusion reasoning engine 316 may utilize, for example, a joint image likelihood function that is defined for multiple, possibly inter-occluded humans. The occlusion reasoning engine 316 may then formulate the multiple human detection problem as, for example, a Maximum A Posteriori (MAP) problem, and then search the solution space to find the best interpretation of the image observations. The occlusion reasoning engine 316 performs this reasoning by, for example, estimating the "Z-buffer" of the responses obtained by estimating the head location according to the relative position of the other detected body parts.

Figure 5A:
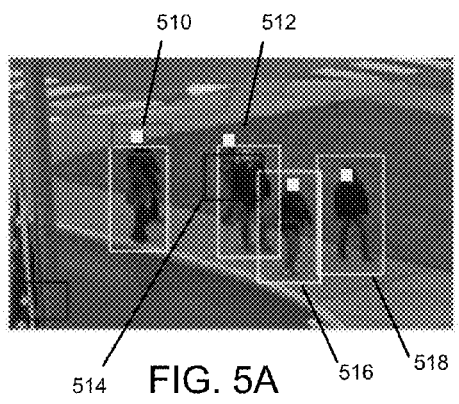
FIGS. 5A-5D are examples of frames taken from a video stream, annotated with markings illustrating detection hypotheses obtained using occlusion reasoning with part-based detectors as disclosed herein.
Figure 5B:
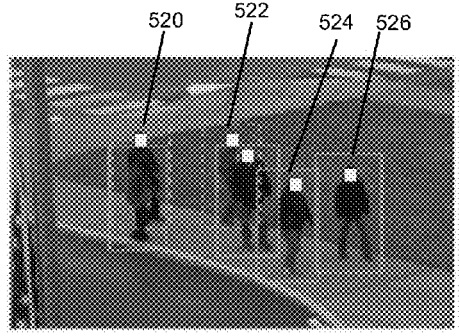

FIGS. 5A and 5B illustrate an example of the occlusion reasoning process performed by the occlusion reasoning engine 316 as applied to human detection in an image in which some of the people are temporarily and/or partially occluded by portions of other people in a group. The occlusions may be temporary and partial in that as the group of people continues walking, occluded portions of the people may become visible (and then perhaps occluded again), and non-occluded (detected) portions of the people may become occluded (and then visible again). FIG. 5A shows an example of a marking 510 output by the head-shoulder detector 334, a marking 514 output by the torso detector 336, and markings 516, 518 output by the full body detector 332. The likelihood of a full-body detection by the full body detector 332 is strong if the occlusion reasoning engine 316 determines that the full body hypothesis output by the full body detector 332 is supported by the body part hypotheses output by the individual part detectors 334, 336, 338. At the same time, the likelihood that a part detection response is missing is large if a body part is occluded by other detection responses with lower Z-values, and thus results in occluded detection hypotheses. The markings 524, 526 in FIG. 5B illustrate final detection hypotheses for full body detections (considering the output of the part-based detectors), while the markings 520, 522 illustrate occluded hypotheses (e.g., estimated full body positions of the occluded people). In FIGS. 5A-5D, as well as FIGS. 8A and 8C, the human faces depicted in the sample images are intentionally occluded for purposes of this disclosure, for privacy reasons.

Figure 5C:
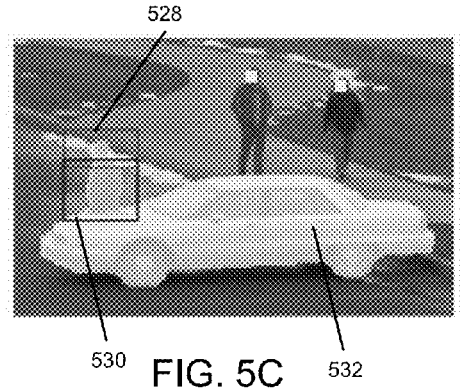
Figure 5D:
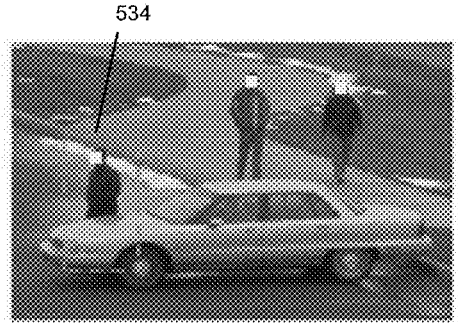

Alternatively or in addition to the inter-occlusion caused by a crowd of people, static occlusions such as trees and buildings, and dynamic occlusions such as vehicles are handled by the occlusion reasoning engine 316. To do this, the occlusion reasoning engine 316 may utilize motion masks instead of the Z-buffering. FIGS. 5C and 5D illustrate an example of a dynamic occlusion reasoning process performed by the occlusion reasoning engine 316 as applied to human detection in an image in which some of the people are temporarily and/or partially occluded by a vehicle. When an occlusion occurs, either the tracked object or the occluding object, or both, may be moving. For example, an occlusion may occur when a person walks behind a parked car or a tree (in which case the system 100 may consider the parked car or the tree to be a static occluder). An occlusion may also occur when a vehicle passes in front of a person standing on a street corner (in which case the system 100 may consider the moving vehicle to be a dynamic occluder). An occlusion may also occur when both the tracked object and the occluder are moving (such as when many people are walking together in a group. In general, the classification of an occlusion as "static" or "dynamic" relates to the nature of the occluder, e.g., whether the occluding object has a substantially constant location (static) or has a variable location (dynamic) In FIG. 5C, a marking 528 is output by the head-shoulder detector 334 and a marking 530 is output by the torso detector 336. The marking 532 illustrates a dynamic mask applied to the image of FIG. 5C. The dynamic mask 532 may be a motion mask that is obtained from the dynamic occlusion map 214. In FIG. 5D, the marking 534 indicates the occlusion hypothesis output by the occlusion reasoning engine 316 after considering the results of the head-shoulder detector 334 and the torso detector 336 in combination with the motion mask 532 applied to the detected vehicle.

Using these techniques, the human detection module 218 can deal with partial and temporary occlusions. For instance, when a person's legs are temporarily occluded in an image of the video stream 216, the person can still be detected and tracked from the upper-body (e.g., based on the responses of a torso and/or head-shoulder detector) until the legs are no longer occluded. Additionally, the detection hypotheses output by the occlusion reasoning engine 316 are based on multiple pieces of evidence, which can reduce false alarms.

The hypothesis fusion engine 318 fuses the raw human detection hypotheses output by the detectors 314 (e.g., one or more of the detectors 332, 334, 336, 338) and analyzed by the occlusion reasoning engine 316, To do this, the illustrative hypothesis fusion engine 318 applies a Non-Maximum Suppression process to the human detection results produced by the occlusion reasoning engine 316. To accomplish human localization, detected humans may be located on the ground plane by utilizing the camera calibration information generated by the calibration module 156 for the camera producing the video stream 216. The camera calibration information is also used to determine the appropriate scale of the human detection markings/bounding boxes (e.g., FIGS. 4A-4D). The hypothesis fusion engine 318 fuses the detection responses together using, for example, a Non-Maximum-Suppression (NMS) procedure in geo-coordinates, where the NMS is physically meaningful. Whereas traditional approaches that perform NMS in 2D space can lose detections because they are incorrectly fused, use of NMS in 3D space can result in a more accurate fusion. To accomplish this, the hypothesis fusion engine 318 can project the centers of all the detection hypotheses to a plane that is parallel to the ground plane at half the average person height (i.e., h=0.9 m). The mean-shift algorithm, with a physically meaningful bandwidth (e.g., the size of human projection on the ground plane), can be used as a local mode finder to produce final detection hypotheses.

The stereo component 320 can provide increased accuracy in detection and localization of detected persons based on stereo depth estimation. In some embodiments, the stereo component 320 is configured to use a pair of cameras arranged in a vertical configuration (e.g., mounted one above the other on a vertical structure, such as a wall, a light pole, or other existing infrastructure). The stereo component 320 can also allow for a substantially larger baseline (>1 meter), which directly increases the accuracy of detections without obstructing the FOV of other cameras mounted on the same structure (e.g., a pole).

In operation, the depth map computation module 322 receives the video stream 216 as input and computes a stereo depth map from the video stream 216, where in this case the video stream 216 includes a pair of images from a vertical stereo camera. The module 322 performs depth-based change detection by executing a change detection algorithm, which also includes background depth modeling, similar to that which is used for monocular cameras, to identify significant foreground pixels. The foreground pixels identified by the change detection algorithm are passed to a geo-space based human segmentation submodule, which computes the detections in the geo-space (including the regions of interest and geo-position of each region of interest). As a result of this process, foreground detection is not affected by shadows and/or other illumination artifacts. The depth of the foreground pixels along with the camera calibration information is used to locate the foreground pixels in 3D. The reconstructed 3D points are then projected and subsequently accumulated on to the ground plane, where an efficient mode-seeking algorithm (e.g., the mean-shift algorithm) using human sized kernels locates local peaks corresponding to human forms. These positive detections of human forms on the ground plane, when mapped back into the image, provide detection regions of interest and segmentations of the pixels that correspond to the detected individuals. The detection stream generated by the geo-space based human segmentation is output to the occlusion reasoning engine 316 and incorporated into the occlusion reasoning as described above.

Figure 6:
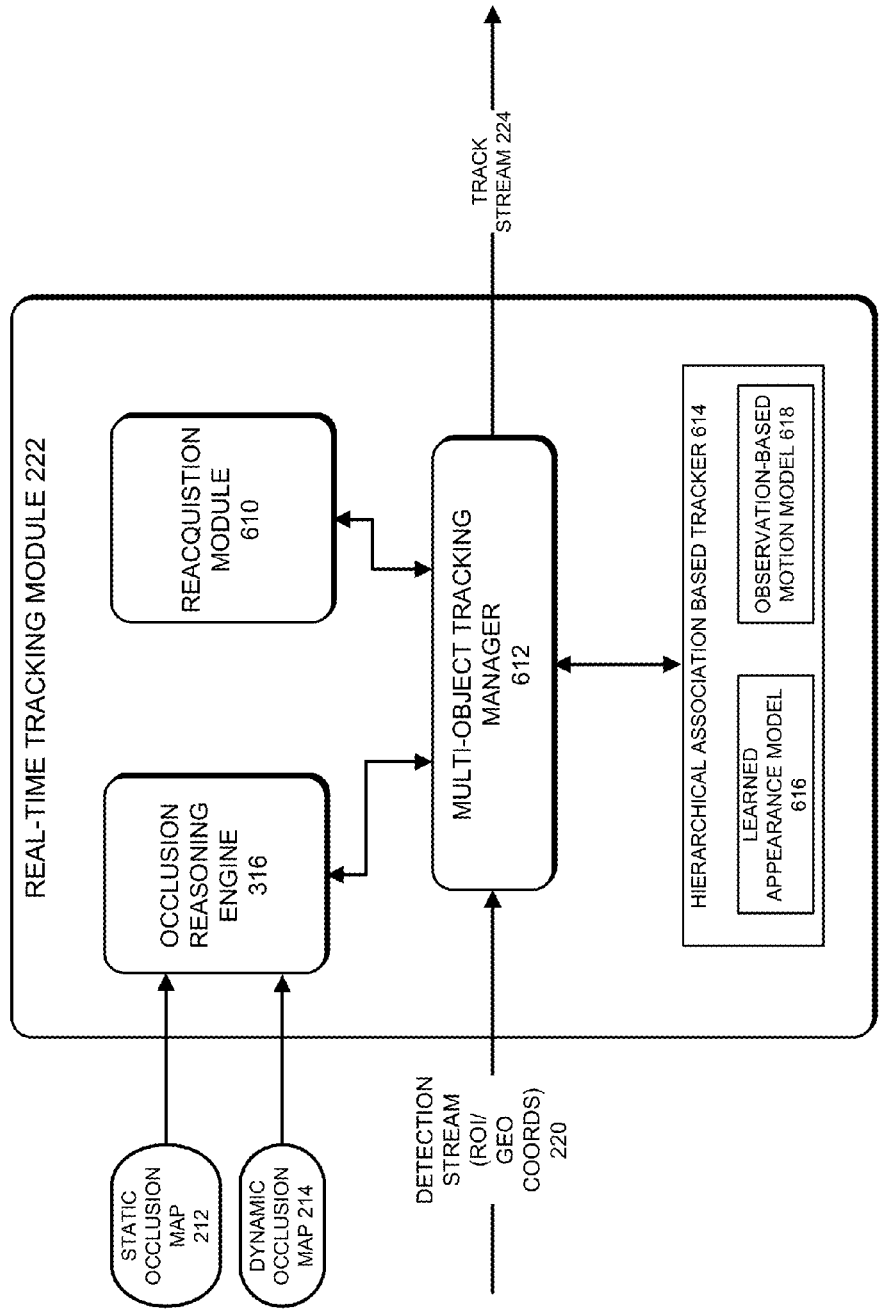
FIG. 6 is a simplified module diagram of at least one embodiment of an the real-time tracking module of FIG. 2.

Referring now to FIG. 6, an embodiment of the tracking module 222 is shown in greater detail, in the context of an environment that may be created during the operation of the system 100 (e.g., an execution or "runtime" environment). The illustrative tracking module 222 and portions thereof are embodied as a number of computer-executable modules, components, and/or data structures, including the above-mentioned occlusion reasoning engine 316. In this case, however, the technologies in the occlusion reasoning engine 316 are applied to analyze temporal sequences of frames for tracking purposes, rather than to analyze individual frames, as is done for detection purposes. The tracking module 222 also includes a reacquisition module 610, a multi-object tracking manager 612, and an hierarchical association based tracker 614. With regard to the occlusion reasoning engine 316 and any other functionality that may be shared by multiple components of the system 100, it should be understood that the occlusion reasoning engine 316 is depicted as a component of both the human detection module 218 and the tracking module 222 for ease of discussion. Such functionality may be embodied as, for instance, separate components (e.g., one or more callable functions) with which each of the human detection module 218 and the tracking module 222 communicates, or as a number of individual components, some of which may be integrated with the human detection module 218 and others of which may be part of the tracking module 222.

The illustrative tracking module 222 receives the detection streams 220 from the human detection module 218, as well as the static and dynamic occlusion maps 212, 214, which are generated by the scene awareness module 210 as described above. The multi-object tracking manager 612 initiates and terminates all of the local tracks, and maintains the hierarchical association based tracker 614, which includes a learned appearance model 616 and an observation-based motion model 618. Other embodiments of the tracking module 222 may include a particle filter 620.

In the tracking context, the occlusion reasoning engine 316 is configured to determine whether to suspend or terminate tracking of a person or object. When a track is temporarily terminated by the tracking module 222, e.g., due to a large or persistent occlusion, the reacquisition module 610 is later executed to link a new track with the terminated track when the object or person reappears in a field of view of one of the cameras of the system 100.

The multi-object tracking manager 612 tracks each detected individual or object. The tracking manager 612 initiates and terminates the local tracks and maintains the states of all of the tracks. The tracking manager 612 initiates a track when a string of consistent detections are observed by the OT node 200. For example, if an object having a similar appearance or motion is detected in a sequence of multiple frames of the video stream 216, the tracking manager 612 may initiate a track for the detected object.

The tracking manager 612 terminates a track when the track exits the FOV of the camera that is associated with the OT node 200. When a track enters a static or dynamic occlusion zone, the tracking manager 612 propagates the track for a short time based on a motion prediction that it generates using the motion model 618. If the track does not emerge from the occlusion zone within a predetermined period of time, the tracking manager 612 temporarily suspends the track. The reacquisition module 610 links the suspended track with a newly initiated track based on, for example, the appearance model 616 of the object.

The occlusion reasoning engine 316 allows the tracking manager 612 to handle person tracking in, for example, a moderately dense crowd or other environments in which inter-personal occlusions are caused by the persons being tracked. Such dynamic occlusions are explicitly modeled by the occlusion reasoning engine 316 maintaining the occlusion information for each of the active tracks as described below.

The occlusion reasoning engine 316 keeps track of occlusion zones that are defined by the tracking manager 612 around each person or object being tracked. Such occlusion zones that are defined in relation to a person or object that is being tracked may be referred to herein as person (or personal) occlusion zones or POZs. As an example, a POZ for a single person may be defined as an oval-shaped region that encompasses the occlusion zone for the person (e.g., a portion of the real-world environment in which, if another object or person were to be located, such other object or person would be at least partially occluded by the person being tracked). The POZs of multiple tracked persons can be merged together when several persons are close to each other, thereby producing a group POZ.

Figure 7:
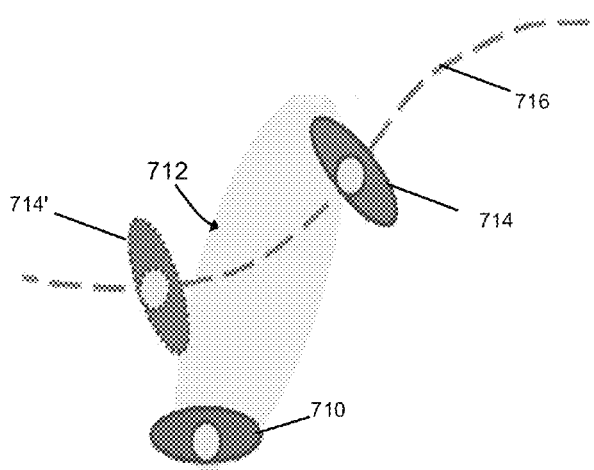
FIG. 7 is a simplified schematic depiction of the use of personal occlusion zones for tracking as disclosed herein.

When a track enters the POZ of another track, an occlusion in the image is typically imminent. When a person is occluded, detections may not be available depending on the extent of the occlusion. In addition, the appearance and motion models 616, 618 may start to deteriorate. Therefore, to prevent the occluded track from abruptly terminating or going astray, the occlusion reasoning engine 316 ties the occluded track to the track of the occluder when no detections are found, as shown in FIG. 7. In FIG. 7, a person A located at a position 710 has an occlusion zone 712. Another person B located at a position 714 has been detected as moving along a track 716. The track 716 intersects with an edge of the occlusion zone 712 when person B reaches the location 714. The track 716 is linked with the occluding track of person A for the duration of the occlusion, that is, while person B is within the personal occlusion zone 712 of person A. This allows the tracking module 222 to maintain tracks for heavily occluded persons as long as the tracks can be assumed to be in the occlusion zone of another tracked person. In this way, the tracking module 222 can prevent the uncertainty of the occluded track from disrupting the tracking. Rather, the uncertainty of the occluded track is limited to the size of the POZ of the occluding track.

The hierarchical association based tracker 614 utilizes an hierarchical track-by-association framework in which human detections generated by the human detection module 218 are associated (or linked) together on the basis of similarity of kinematics and appearance, using the learned appearance model 616 and the observation-based motion model 618. Using this approach, the tracking solution is generated globally as a joint decision using all of the objects involved in the tracking. Individual detections are associated together over time to form a track for a particular tracked object. The associations produce short segments of associated detections, which may also be called tracklets and may represent the beginning of a track. Detections that do not get associated are discarded as likely false alarms. At subsequent stages of the hierarchy, the tracklets are associated with other tracklets across larger frame gaps to form longer tracklets. Between each stage, a Gaussian process-based tracklet smoothing is performed to condition the tracklet data arising from noisy measurements. This process of alternatively conditioning and associating tracklets provides robustness against local minima. The final stage of association, called global association, links these tracklets to currently active tracks. The remaining tracklets are then used to seed new tracks in the system. In this way, the tracking module 222 can use a set of measurements and constraints that includes online updated appearance models, shape models, and kinematics in world coordinates, rather than simply relying on human detections after track initialization.

For a real-time implementation of the association-based tracker 614, a sliding temporal window is used. Tracking is solved within a temporal window of a specified length (w). When this tracking is completed, a new window is considered by sliding the window forward by another length (s), leaving some amount of overlap with the first window. The section of the first window that does not overlap with the new window, called the uncache zone, is the portion that is be output by the system as final results. For the remaining portion of the window, the results are all discarded but for the first stage low-level association, called the unlink zone. This portion along with the new frames in the second window, called the fresh zone, is used for performing the local to global association again. This process is repeated as the window slides forward in time. Using this approach, all tracklets associate information from both the past and the future states of the tracks.

Figure 8A:
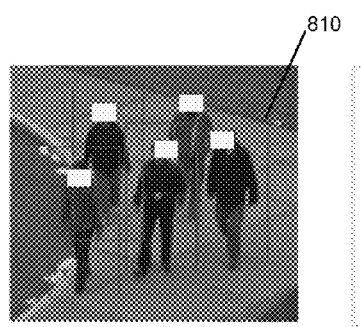
FIG. 8A is a simplified example of a frame taken from a video stream, annotated to show examples of human detection hypotheses generated by the human detection module of FIG. 3.
Figure 8B:
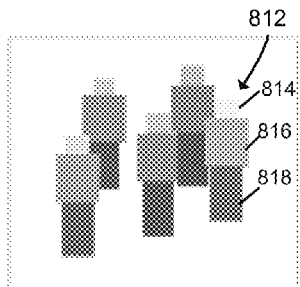
FIG. 8B is a simplified example of an appearance model mask for each of the persons detected in the image of FIG. 8A.
Figure 8C:
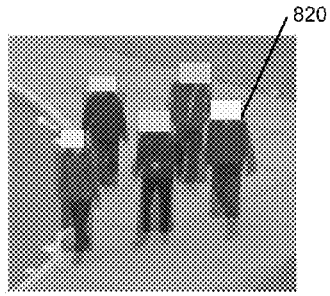
FIG. 8C is a simplified example of the appearance model masks of FIG. 8B applied to the image of FIG. 8A.
Figure 8D:
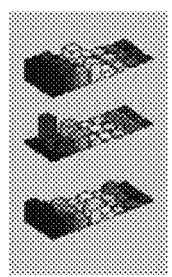
FIGS. 8D-8H are simplified examples of part-based spatially-encoded color histograms representing appearance features of each of the persons detected in the image of FIG. 8A.
Figure 8E:
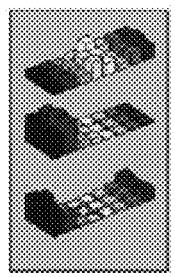
Figure 8F:
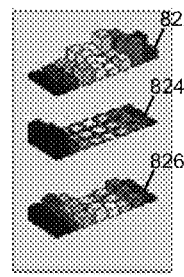
Figure 8G:
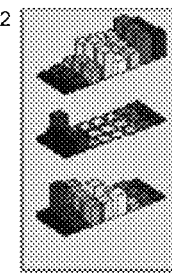
Figure 8H:

The illustrative appearance model 616 is embodied as descriptive appearance model that uses a spatially encoded color histogram to represent the appearance of a human person. Referring to FIGS. 8A-8H, using the human detection hypotheses output by the human detection module 218 (e.g., human detection hypothesis 810 shown in FIG. 8A), each person detected in an image (FIG. 8A) is partitioned or separated into a set 812 of rectangles (or other suitable geometric shapes) 814, 816, 818 as shown in FIG. 8B. The human body is thus separated into multiple (e.g., three) parts, e.g., head, torso and legs, and each block 814, 816, 818 is represented by a spatially encoded color histogram (FIGS. 8D-8H). For example, in FIG. 8F, the histogram 822 represents the block 814, while the histogram 824 represents the block 816 and the histogram 826 represents the block 818. FIGS. 8E-8H similarly illustrate spatially encoded color histograms for each of the other sets of color blocks depicted in FIG. 8B, each of which maps to a person detected in FIG. 8A as shown in FIG. 8C. In other words, FIG. 8A illustrates human detections that may be output by the human detection module 218; FIG. 8B illustrates appearance model masks for each of the persons in the image of FIG. 8A; FIG. 8C illustrates the masks of FIG. 8B applied to the image of FIG. 8A; and FIGS. 8D-8H illustrate the appearance features for each of the persons detected in the image of FIG. 8A, which are generated using the masks of FIG. 8B. The illustrative histograms of FIGS. 8D-8H are encoded in two dimensions: spatially along the y-axis (vertical in the image) and RGB (visible spectrum) color on the other.

Occlusion reasoning is applied to the appearance model 616 by taking the geo-coordinates of the detected people into account and using the geo-coordinates to mask out occluded regions from the image. Use of the part-based spatially encoded color histogram as described herein can have the following advantages: (i) occlusions are considered in a principled way, and (ii) the histogram has a strong discriminative ability. For instance, using the appearance model 616, a person wearing a blue shirt with black trousers can be differentiated against a person in a dark shirt with blue jeans, whereas the traditional color histogram cannot make this distinction, because both people will have the same representation in the traditional color histogram.

The tracking module 222 seeks to maintain the identities and states of objects at each time instant of the video stream 216. However, missing detections, false alarms and erroneous detections are often inevitable. Thus, the conventional "detect and associate" types of approaches cannot make full use of the spatio-temporal contextual cues that are often available in the video data. At the other extreme, the popular mean-shift like approaches can rely too much on the spatio-temporal continuity in appearance and motion and, thus, cannot provide robust tracking capabilities in crowded scenarios. Some embodiments of the tracking module 222 do not rely solely on the human detections after track initialization. Instead, the tracking module 222 can apply a tracking algorithm that utilizes a comprehensive set of measurements and available constraints, such as appearance, shape, kinematics and occlusions.

Longer term occlusions caused by static occluders (trees, buildings, etc.) or dynamic occluders (vehicles, other people, etc.) can be dealt with by the system 100 using the reacquisition module 610 to maintain track IDs notwithstanding the presence of long-term occlusions. In one illustrative example, a group of trees is detected in the video stream 216. The scene-awareness module 210 generates an occlusion zone (OZ) caused by the group of trees. The generating of occlusion zones by the scene awareness module may be performed online (e.g., in real time) or offline, according to the requirements of a particular design of the system 100. If a tracked person A enters the OZ, the tracking module 222 associates the person's track A with the OZ. The track A still may be partially visible in the OZ and may be updated for a short period until it is completely occluded. When this occurs, the tracking manager 612 alerts the reacquisition module 610 and the reacquisition module 610 creates and maintains information relating to the occlusion event, e.g., that "track A has entered is now occluded by OZ." When track A reappears on the boundary of the OZ as a new track, the tracking manager 612 triggers the reacquisition module 610 to recover the new track's identity from all possible tracks that have been occluded by the OZ. The reacquisition module 610 makes the decision to link the new track with the occluded track by checking the appearance models 616 and motion model (e.g., a viable kinematics model) 618 for each tracked object. It should be understood that the OZ described in this example may be created by a static occluder, or may be created dynamically, e.g., by a crowd of people or a vehicle. The reacquisition module 610 maintains track IDs across dynamic (e.g., inter-personal) and static occlusions, and also maintains the track IDs during handoff when there are no overlaps in the FOVs, as described above. To do this, the reacquisition module 610 leverages the information in the appearance models 616, which may be continuously or periodically updated (e.g., through an online or offline process) with descriptive information about the tracked persons or objects.

Some embodiments of the tracking module 222 include a "subset tracking mode." In the subset tracking mode, the tracking module 222 may not initiate tracks for all of the visible individuals in the video stream 216, but only for those individuals that are detected as being located within the vicinity of a defined location or "region of interest," such as an alarm zone or an occlusion zone. For example, the tracking module 222 may only initiate tracking of an individual if and when the individual's geo-coordinates are within a defined range of the specified detection zone. The geo-coordinates of the desired detection zone may be provided by, for example, the client subsystem 138 (e.g., the subset geo-coordinates 140).

In order to track designated people in the subset tracking mode in the presence of dynamic occlusions, the system 100 may track people that are detected in the vicinity of the designated tracked objects (in addition to tracking the designated objects). For example, in the subset tracking mode, the tracking algorithm executed by the tracking module 222 may initiate tracks for every object that comes near the designated people being tracked. To do this, the tracking module 222 may establish a predefined region, the zone-of-interest (ZOI), around each person being tracked. Any undesignated people detected within these ZOIs are then tracked for the duration of time that they remain in the ZOI.

In one example, a location sensor of a tracking system may issue a zone alarm upon detecting the presence of a Person A within a specified alarm zone of the system 100. The zone alarm triggers the system 100 to enter the subset tracking mode. In response, the tracking module 222 identifies (e.g., tags) Person A as a person of interest, initiates tracking of Person A, and defines the ZOI for Person A. During the time in which Person A is being tracked, any other persons that enter Person A's ZOI are also tracked, while other people that are detected in the scene (e.g., the FOV of the camera associated with the OT node 200) but who are not detected in Person A's ZOI are not tracked.

In another example, people that are detected within an alarm zone may remain occluded throughout the duration of their stay in the alarm zone. This may occur when a group of people are walking together and some of the people are walking in front of the others. To handle this, the tracking module 222 can use the personal occlusion zones described above to determine when to initialize a track for a person who may be heavily occluded but still within the vicinity of an alarm zone. For instance, the tracking module 222 can initialize a track for the occluded person when they enter the personal occlusion zone of another person that is already being tracked, even if the occluded person is not in the alarm zone.

In some embodiments, the tracking module 222 may switch to the subset tracking mode upon receipt of an electronic notification, such as a zone alarm alert, from another component of the system 100 or from an external system such as the client system 138. The notification may be received either through the standard communication channels discussed above or through the OT GUI 154. Such a notification may include, for example, the UTM coordinates of designated objects as well as a description of the size and shape of the alarm zone (for example, a circular area having a radius of 10 meters).

The subset tracking mode may be used to, among other things, limit the tracking load for the system 100. For example, when faced with a crowd of hundreds of people, the system 100 may choose a subset of people to track in order to maintain the fidelity of the tracks and meet the applicable real-time latency requirements.

Figure 9:
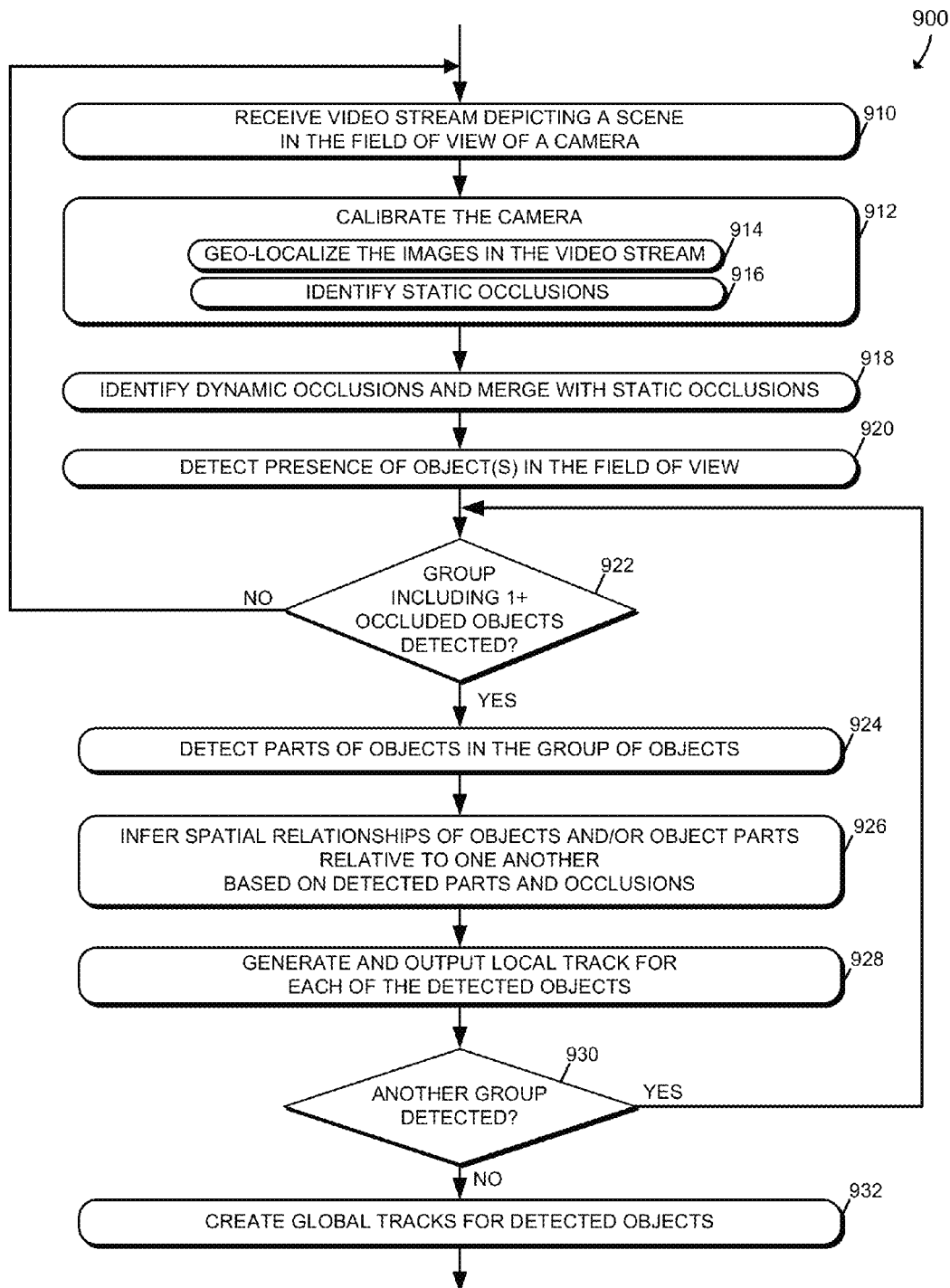
FIG. 9 is a simplified flow diagram of at least one embodiment of a method by which the system of FIG. 1 may perform object detection and tracking as disclosed herein.

Referring now to FIG. 9, an illustrative method 900 by which the system 100 may perform object detection and tracking is shown. The method 900 may be embodied as computerized programs, routines, logic and/or instructions executed by the computing system 100, for example by the OT module 110. At block 910, the system 100 receives a video stream depicting a scene in the field of view of a camera. To do this, the system 100 communicates with the camera (e.g., one of the cameras 112, 114, 116) by, for example, a network or bus connection. As noted above, the field of view may be defined by a number of different factors including the positioning of the camera with respect to the real world environment and camera parameters such as focal length and others. In some cases, the camera may be specially arranged to acquire images of the real-world environment within a particular field of view (as with fixed-location cameras), while in other embodiments, the field of view may be "ad hoc" or dynamically established at different time instants as a result of camera movement (as may be the case with mobile device cameras). At block 912, the system 100 calibrates the camera. For fixed-location cameras, calibration may be performed once or infrequently, while for mobile cameras, calibration may be performed repeatedly (e.g., on a frame-by-frame basis, since mobile cameras may be in continuous motion with six degrees of freedom). In order to utilize the video captured by mobile cameras in motion for purposes of object tracking as disclosed herein, the video received from such cameras can be calibrated using algorithmic pose estimation techniques. Further, the system 100 can geo-register or geo-localize the images in the video stream. Some examples of techniques for alignment and geo-localization of street-view captured images, e.g., by comparison with aerial image databases, are described in the following publications, which are incorporated herein by this reference: U.S. Patent Application Publication No. 2012/0314935 (Method and Apparatus for Inferring the Geographic Location of Captured Scene Depictions); Ultra-wide Baseline Facade Matching for Geo-localization, Mayank Bansal, Kostas Daniilidis, and Harpreet Sawhney, ECCV Workshop on Visual Analysis and Geo-Localization of Large-Scale Imagery, A. Fusiello et al. (Eds.): ECCV 2012 Ws/Demos, Part I, LNCS 7583, pp. 175-186 (2012); Geo-localization of street views with aerial image databases, Mayank Bansal, Harpreet S. Sawhney, Hui Cheng, and Kostas Daniilidis, Proceedings of the 19th ACM international conference on Multimedia (MM '11), pp. 1125-1128 (2011); and Joint Spectral Correspondence for Disparate Image Matching, Mayank Bansal, Kostas Daniilidis, The IEEE Conference on Computer Vision and Pattern Recognition (CVPR), pp. 2802-2809 (2013). At block 916, the system 100 identifies the static occlusions in the video image and creates the static masks for the static occlusions using, for example, the static occlusion maps and techniques described above. As noted above, the process of identifying static occlusions may be performed as part of the camera calibration process in some embodiments. In other embodiments, however, the static occlusions may be continuously identified and updated, e.g., as the camera's field of view changes.

At block 918, the system 100 identifies any dynamic occlusions in the field of view, as reflected in the images of the video stream received at block 910. To do this, the system 100 applies a dynamic occlusion map to each time instant of the video stream and establishes dynamic masks for the dynamic occlusions that are identified. The system 100 may also merge the dynamic occlusions with the static occlusions established at block 916 to create an occlusion map of the scene. To do this, the system 100 may map the static and dynamic masks to the ground plane.

At block 920, the system 100 detects the presence of one or more objects in the video stream received at block 910. To do this, the system 100 executes one or more feature computation algorithms as mentioned above. As noted above, one or more of the detected objects may be temporarily and/or partially occluded in the field of view. At block 922, the system 100 determines whether a group of objects including one or more temporarily and/or partially occluded objects has been detected. To do this, the system 100 analyzes the objects detected at block 920 in conjunction with the occlusion information generated at block 918 (e.g., the static and dynamic occlusion maps 212, 214). If a group including an occluded object has not been detected, the system 100 returns to block 910. If a group including a temporarily and/or partially occluded object is detected, the system 100 proceeds to execute a part-based detection analysis at block 924.

At block 924, the system 100 executes one or more part detection algorithms to detect parts of the objects in the group including the temporarily and/or partially occluded object, where the part detectors are designed to detect specific object parts independently of other parts of the object (and a "part" of the object is less than the entire object). For example, the system 100 may execute the head, torso, and leg part-based detectors described above. The system 100 may also execute a full body detector as described above at block 924 or may have already done so previously at block 920.

At block 926, the system 100 infers or predicts the spatial relationships of the objects in the group of objects (and/or parts of the objects) detected at block 920, relative to one another, based on the object parts detected at block 924 and the occlusions identified at blocks 916, 918. To do this, the system may compare the results output by the part detectors to the results output by the full body detector. Additionally, the system 100 uses the information about the location, motion, and appearance of the detected objects and/or object parts to reason about and predict the spatial arrangement of the objects and/or object parts, including any occluded parts. In doing so, the system 100 may resolve relationships between different object parts and generate assignments of object parts to objects. For example, the system 100 may execute the occlusion reasoning and hypothesis fusion techniques described above to determine which arms or torsos belong to which persons detected in a crowd or to determine the three-dimensional spatial relationships between people in a group. As an example, a detection of two heads in close proximity but only one torso may indicate that one person is walking closely behind another person. The system 100 may employ the stereo-based detection techniques described above to improve the accuracy of depth computations or for other reasons.

At block 928, the system 100 generates and outputs a local track for each of the detected objects (even if the detected object is temporarily and/or partially occluded). In doing so, the system 100 may utilize occlusion zones as described above to initiate, temporarily suspend, terminate, or continue the object's track through the presence of occlusions. At block 930, the system 100 determines whether there is another group of objects detected in the video stream that needs to be analyzed, using procedures similar to that described above in connection with blocks 920, 922. If another group of objects is detected, the system 100 returns to block 922 and determines whether the group of objects includes a temporarily and/or partially occluded object. If the group includes a temporarily and/or partially occluded object, the system 100 executes the part-based detection, occlusion reasoning, and hypothesis fusion processes described above. If no other occluded objects are detected in the video stream, the system 100 creates a global track for each of the detected and tracked objects, at block 932. For example, at block 932, the system 100 may create an object-specific global track by fusing all of the local tracks created by all of the OT nodes in the system for the detected object. In other words, each global track may contain a track stream for an object across the fields of view of multiple cameras that are linked by the system 100. The system 100 may output the global track and/or any of the local tracks and videos to, for example, the client system 138 and/or the OT GUI 154.

Example Usage Scenarios

Figure 10:
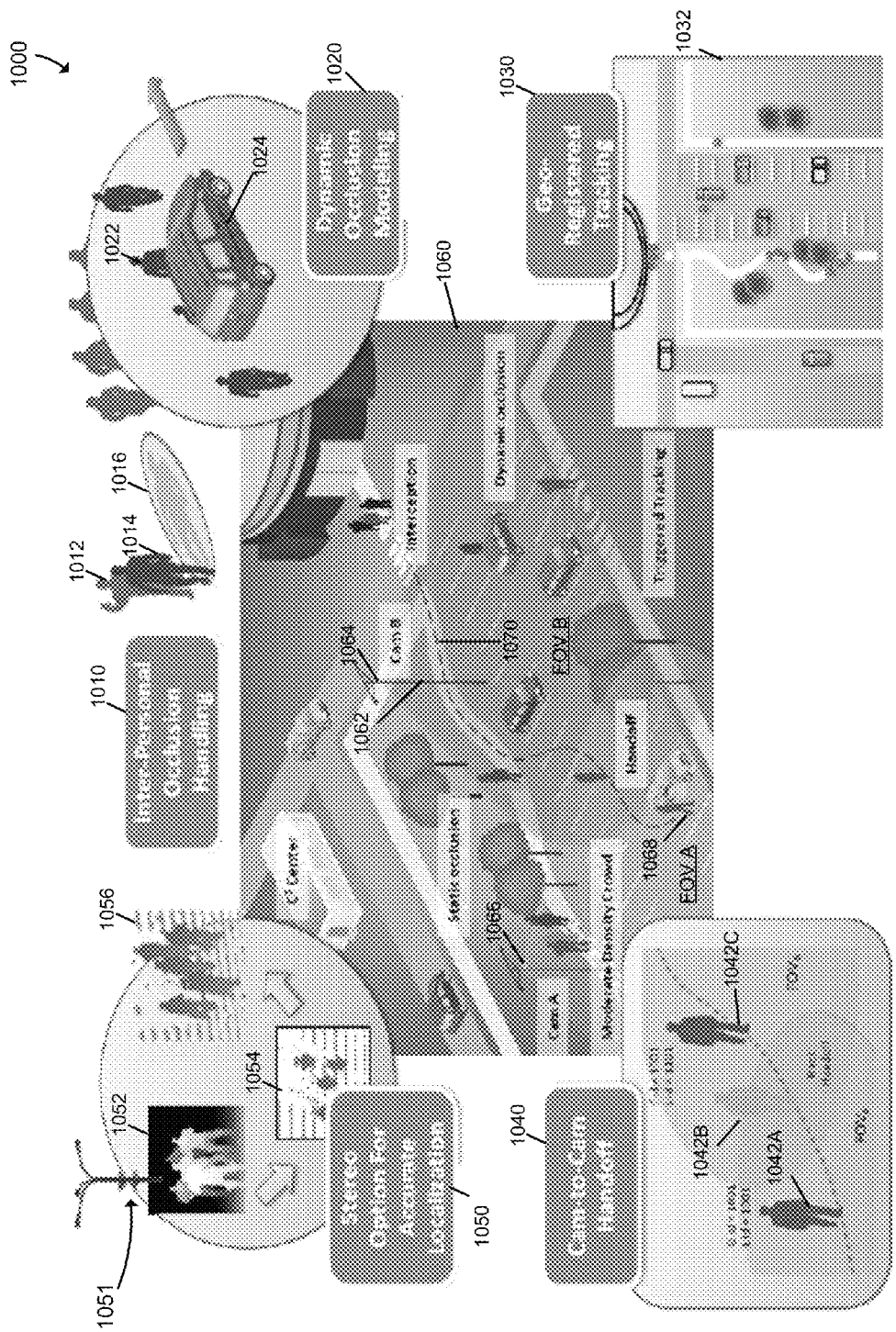
FIG. 10 is a simplified schematic illustration of an example implementation of the system of FIG. 1.

Referring now to FIG. 10, an embodiment 1000 of the object detection and tracking computing system 100 is shown in operation. The illustrative system 1000 includes an OT module 110 in a deployment at a surveillance location 1060 having a camera network that includes vertically-mounted cameras 1064, 1066, each of which has a field of view (e.g., FOV A and FOV B). In the illustration, the field of view of the cameras 1064, 1066 overlap, but this need not be the case.

The system 1000 is designed to be modular and easily expandable to cover a large geographic area with a large network of cameras. The system 1000 performs real-time detection and tracking of people (e.g., a person 1068) in moderately dense crowds in the presence of static and dynamic occlusion with the following functionality, which may be executed by one or more of the components of the OT module 110 described above: (i) scene-aware occlusion reasoning capable of dealing with both static and dynamic occlusions, including (a) inter-personal occlusion handling 1010, which handles occlusion of a person 1012 created by a tracked person 1014 by creating an occlusion zone 1016; and (b) dynamic occlusion modeling 1020, which can handle a temporary, partial occlusion of a tracked object (e.g., a person 1022) by a dynamic occlude (e.g., a moving vehicle 1024); (ii) part-based human detectors capable of handling substantial occlusions, (iii) smart hypothesis fusion in 3D to prevent distinct detections from fusing, (iv) explicit modeling of inter-personal occlusions during tracking, (v) a descriptive appearance model for better person disambiguation, (vi) occlusion-aware appearance modeling of objects, (vii) tracking using particle filters and Bayesian estimation, (viii) motion and appearance-based track reacquisition. Additionally, the system 1000 includes geo-registered tracking 1030, which maps detected objects to geographic coordinates (such as UTM coordinates); camera to camera handoff 1040, which can continue tracking a person 1042 across multiple fields of view (e.g., from a position 1042 A in FOV A but not FOV B, to a position 1042B in an overlapping area of FOV A and FOV B, to a position 1042C in FOV B but not FOV A); and a stereo option for accurate localization 1050, which may use a pair of vertically mounted cameras 1051 to resolve depth detection of people in a crowd 1052 by generating detections 1054 in 3D and applying a fusion algorithm to generate a fused detection 1056 in 3D.

The system 1000 can be deployed with monocular cameras and/or stereo cameras. Stereo cameras may provide better tracking and geo-location accuracy in dense, free-flowing crowds, and diverse environmental and lighting conditions. In the illustrated usage scenario, each camera 1064, 1066 is mounted on a mast or pole (e.g., pole 1062). The camera can deliver video on, for example, an Internet protocol, so that the video can be conveyed to a host computer as needed, with, e.g., a coax cable. The system 1000 can utilize a standard power supply as well as a standard communication link for the video and metadata received from the cameras. The illustrative system 1000 utilizes a commercial off the shelf (COTS) multi-core central processing unit/graphics processing unit (CPU/GPU) architecture. Additional GPUs/cores can be added per camera as may be needed to track a greater number of people at the same frame rate and latency, or to use cameras with greater resolution.

The illustrative system 1000 utilizes ground-level and/or airborne sensors (e.g., location sensors, cameras, etc.) for object detection and tracking. The system 1000 can provide, for example: robust human detection with low false alarms under occlusions in environments with illumination variations, camera shakes, extraneous motions such as from foliage, flags, etc., and with vehicles moving; comprehensive appearance, shape and motion modeling for robust tracking even when objects occlude each other, tracks are lost temporarily and humans change their poses; and a deployed multi-camera handoff architecture that uses geo-locations of tracks, object fingerprinting and dynamic and static occlusion modeling to maintain tracks over wide areas.

The system 1000 may use a single appearance model that is relatively invariant to pose variations and is updated over time, or can maintain multiple appearance representations per track to capture a richer set of appearance models. With multiple appearance models, the reacquisition functionality of the system 1000 may perform set-to-set matching to obtain potential matching tracks across the gaps between fields of view. Additionally, the system 1000 can be configured with a classifier that learns (e.g., by executing one or more machine learning techniques) distributions of same and different objects across the different fields of view of the cameras, using training data and multiple appearance models. An existing classifier for real-time handoff of vehicle tracks across cameras separated by hundreds of meters can be adapted for this purpose.

In another usage scenario, modules of the system 100 can analyze e.g. low-resolution aerial video of the video stream 216 and identify a pedestrian or moving object in the video stream by generating a motion pattern for the detected person and extracting a multi-scale intrinsic motion structure (MIMS) feature from the motion pattern. To detect and track a person or object using e.g. wide area aerial imagery, the system 100 may algorithmically analyze the aerial imagery to identify a motion pattern in the aerial imagery; extract a multi-scale intrinsic motion structure (MIMS) feature from the motion pattern; and use the MIMS feature to detect a person or object. For some persons or objects, such as occluded people or objects, the system 100 may predict the detection of the person or object based on a plurality of previously-generated motion models.

In one example, the system 100 encodes intrinsic motion properties of an object that are location, velocity, and trajectory-shape invariant. The extracted MIMS representation is robust to noisy flow estimates. For instance, given a video stream 216, the system 100 may perform a stabilization process to compensate for camera motion, among other things, and compute dense optical flows on the stabilized video stream for a number of consecutive frames of the video stream. Tensor voting may be used to group 4D samples from the multiple frames of the video stream by selecting different neighborhood sizes in both spatial and temporal domains during the voting process. The system 100 can extract an intrinsic motion structure (IMS) for each pixel of the imagery at multiple different scales, in order to capture the intrinsic property of the motion of the detected object (e.g., vehicle or pedestrian motion). A more detailed illustration of this application of the system 100 is provided in the above-mentioned U.S. Provisional Patent Application Ser. No. 61/983,479, filed Apr. 24, 2014, which is entitled "Pedestrian Detection In Low-Resolution Imagery By Learning Multi-Scale Intrinsic Motion Structures (MIMS)," and is incorporated by reference in its entirety.

Other potential applications of current importance include using the system 100 to track people or vehicles of interest over time in the vicinity of a high-profile crime, terrorist incident, or disaster, like the Boston Marathon bombing, by analyzing captured video from a combination of fixed surveillance cameras and ad hoc individual smartphone videos. Statistical analysis and correlation of tracks and movement for people and/or vehicles in and around a scene of interest facilitates automated detection of anomalies/threats, forensic interpretation of crimes, disasters or other problems, and can be used in other automated detection scenarios, particularly those involving a crowded scene. A more detailed illustration of this application of the system 100 is provided in the above-mentioned U.S. Provisional Patent Application Ser. No. 61/994,334, filed May 16, 2014, which is entitled "Dynamic N-Dimensional Video Visualization," and is incorporated by reference in its entirety.

Implementation Examples

Figure 11:
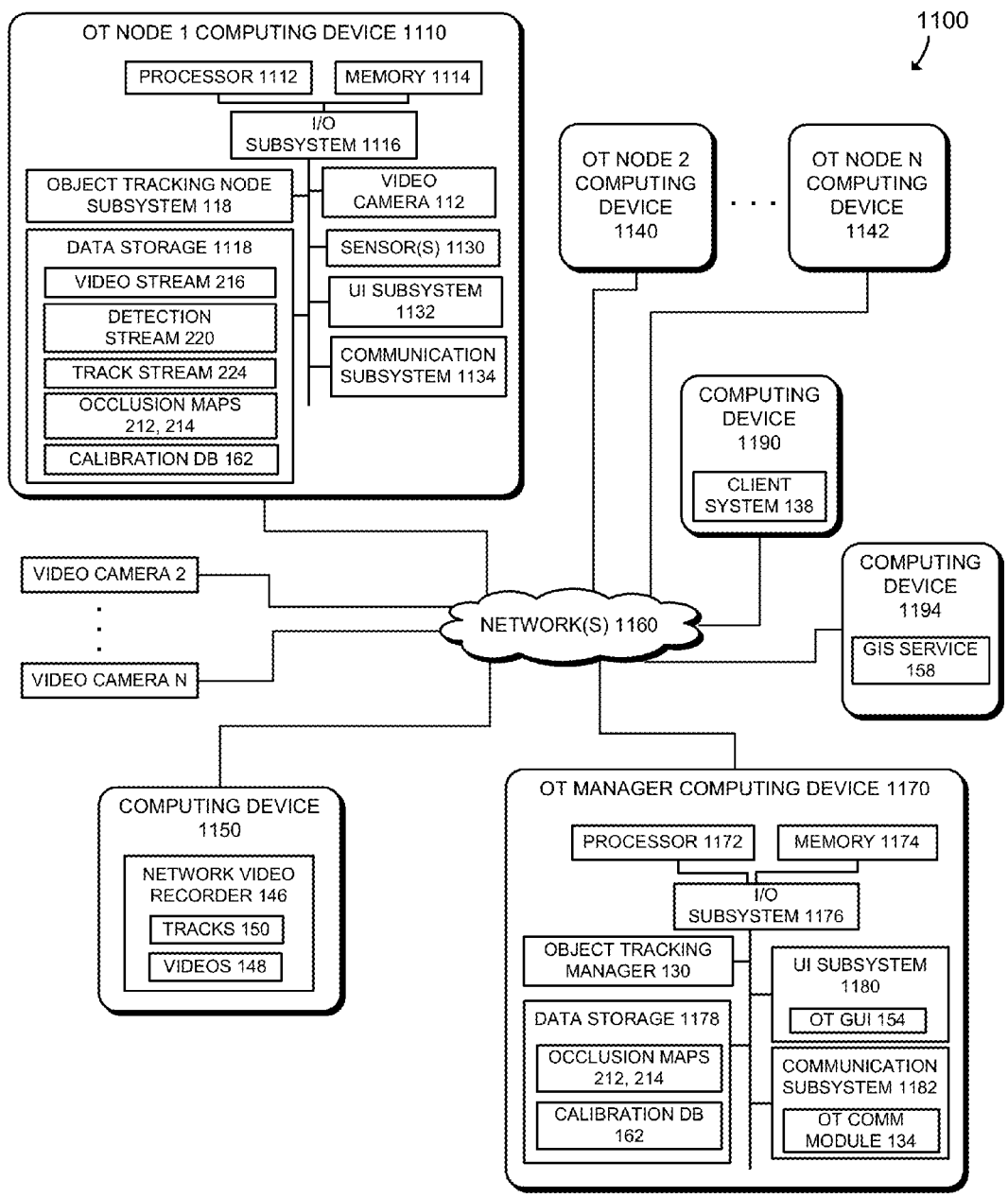
FIG. 11 is a simplified block diagram of an exemplary computing environment in connection with which at least one embodiment of the system of FIG. 1 may be implemented.

Referring now to FIG. 11, a simplified block diagram of an embodiment 1100 of the object detection and tracking computing system 100 is shown. While the illustrative computing system 1100 is shown as involving multiple components and devices, it should be understood that in some embodiments, the computing system 1100 may constitute a single computing device, alone or in combination with other devices. The computing system 1100 includes a computing device 1110, which embodies the features and functionality of the first OT node 118 depicted in FIG. 1. The computing system 1100 similarly includes other computing devices 1140, 1142, which embody the features and functionality of the second and nth OT nodes 120, 122 of FIG. 1. Each or any of the computing devices 1110, 1140, 1142 may be in communication with one or more other computing systems or devices, including a number of video cameras 2 through N (where N is a positive integer), a computing device 1150 embodying the NVR 146, an OT manager computing device 1170, a computing device 1190 embodying the client system 138, and a computing device 1194 embodying the GIS service 158, via one or more networks 1160. In some embodiments, the cameras 2-N may be incorporated into the respective computing devices 1110, 1140, 1142 rather than in communication with the computing devices 1110, 1140, 1142 by a network 1160.

The system 1100 or portions thereof may be distributed across multiple computing devices that are connected to the network(s) 1160 as shown. In other embodiments, however, the system 1100 may be located entirely on, for example, the computing device 1170 or a computing device 1110, 1140, 1142. In some embodiments, portions of the system 1100 may be incorporated into other systems or computer applications. Such applications or systems may include, for example, operating systems, middleware or framework software, and/or applications software. For example, portions of the system 1100 may be incorporated into or accessed by intelligent assistance applications. As used herein, "application" or "computer application" may refer to, among other things, any type of computer program or group of computer programs, whether implemented in software, hardware, or a combination thereof, and includes self-contained, vertical, and/or shrink-wrapped software applications, distributed and cloud-based applications, and/or others. Portions of a computer application or application may be embodied as firmware, as one or more components of an operating system, a runtime library, an application programming interface (API), as a self-contained software application, or as a component of another software application, for example.

The illustrative computing device 1110 includes at least one processor 1112 (e.g. a microprocessor, microcontroller, digital signal processor, etc.), memory 1114, and an input/output (I/O) subsystem 1116. The computing device 1110 may be embodied as any type of computing device capable of performing the functions described herein, such as a personal computer (e.g., desktop, laptop, tablet, smart phone, body-mounted device, wearable device, etc.), a server, an enterprise computer system, a network of computers, a combination of computers and other electronic devices, or other electronic devices. Although not specifically shown, it should be understood that the I/O subsystem 1116 typically includes, among other things, an I/O controller, a memory controller, and one or more I/O ports. The processor 1112 and the I/O subsystem 1116 are communicatively coupled to the memory 1114. The memory 1114 may be embodied as any type of suitable computer memory device (e.g., volatile memory such as various forms of random access memory).

The I/O subsystem 1116 is communicatively coupled to a number of hardware and/or software components, including the OT node subsystem 118, a video camera 112, and a user interface subsystem 1132, which includes one or more user input devices (e.g., a touchscreen, keyboard, virtual keypad, microphone, etc.) and one or more output devices (e.g., speakers, displays, LEDs, etc.). The I/O subsystem 1116 is also communicatively coupled to one or more storage media 1118, one or more one or more sensor(s) 1130 (e.g., geo-location sensors, such as Global Positioning System devices), and a communication subsystem 1134. It should be understood that each of the foregoing components and/or systems may be integrated with the computing device 1110 or may be a separate component or system that is in communication with the I/O subsystem 1116 (e.g., over a network 1160 or a serial bus connection).

The storage media 1118 may include one or more hard drives or other suitable data storage devices (e.g., flash memory, memory cards, memory sticks, and/or others). In some embodiments, portions of the OT node subsystem 118, the video stream 216, the detection stream 220, the track stream 224, the occlusion maps 212, 214, the calibration db 162, and/or other data reside at least temporarily in the storage media 1118. Portions of the OT node subsystem 118, the video stream 216, the detection stream 220, the track stream 224, the occlusion maps 212, 214, the calibration db 162, and/or other data may be copied to the memory 1114 during operation of the computing device 1110, for faster processing or other reasons.

The communication subsystem 1134 may include the OT comm module 134, and may communicatively couple the computing device 1110 to one or more other devices, systems, or communication networks, e.g., a local area network, wide area network, personal cloud, enterprise cloud, public cloud, and/or the Internet, for example. Accordingly, the communication subsystem 1134 may include one or more wired or wireless network interface software, firmware, or hardware, for example, as may be needed pursuant to the specifications and/or design of the particular system 1100.

The OT manager computing device 1170 may be embodied as any suitable type of computing device capable of performing the functions described herein, such as any of the aforementioned types of devices or other electronic devices. For example, in some embodiments, the OT manager computing device 1170 may include one or more server computers including storage media 1178, which may be used to store portions of the object tracking manager 130, the occlusion maps 212, 214, the calibration databases 162, 164, 166, and/or other data. The illustrative computing device 1170 also includes a user interface subsystem 1180, which may include the OT GUI 154, and a communication subsystem 1182, which may include portions of the OT comm module 134. In general, components of the computing device 1170 having similar names to components of the computing device 1110 described above may be embodied similarly. Further, each of the computing devices 1140, 1142, 1150, 1190, 1194 may include components similar to those described above in connection with the computing device 1110 and/or the computing device 1170. The computing system 1100 may include other components, subcomponents, and devices not illustrated in FIG. 11 for clarity of the description. In general, the components of the computing system 1100 are communicatively coupled as shown in FIG. 11 by signal paths, which may be embodied as any type of wired or wireless signal paths capable of facilitating communication between the respective devices and components.

Additional Examples

Illustrative examples of the technologies disclosed herein are provided below. An embodiment of the technologies may include any one or more, and any combination of, the examples described below.

In an example 1, a real-time object detection and tracking system includes, embodied in one or more computer accessible storage media: an object tracking (OT) node to detect and track one or more objects in a group of objects depicted in a video stream produced by a camera having a field of view arranged to acquire images of a real-world environment, by: detecting a plurality of parts of objects in the group of objects, each of the detected parts being less than an entire object; inferring a spatial relationship between at least two of the objects in the group of objects based on the detected parts; and outputting a local track for one or more of the objects in the group of objects, the local track includes a unique identifier and a geo-location of one or more of the objects at different time instants of the video stream.

An example 2 includes the subject matter of example 1, wherein the OT node is to identify one or more occlusions depicted in the video stream and infer a spatial relationship between a temporarily and/or partially occluded object of the group of objects and at least one other object in the group of objects based on the detected parts and the identified occlusions. An example 3 includes the subject matter of example 1 and a plurality of OT nodes each associated with a field of view of a different camera of a plurality of cameras arranged in the real-world environment, wherein each of the OT nodes is to output a local track for a different field of view, and an OT manager to create a global track by fusing the local tracks output by the OT nodes. An example 4 includes the subject matter of example 3, wherein at least two of the cameras have non-overlapping fields of view and the OT manager is to determine if a local track associated with one of the non-overlapping fields of view is a continuation of a local track associated with another of the non-overlapping fields of view. An example 5 includes the subject matter of example 3, wherein at least one of the cameras is embodied in a mobile consumer electronic device, and the mobile consumer electronic device is to transmit the video stream to the OT node by a communication network. An example 6 includes the subject matter of any of the preceding examples, wherein the OT node includes a scene awareness module to determine a dynamic occlusion map for the field of view associated with the OT node, and the OT node uses the dynamic occlusion map to create the local track. An example 7 includes the subject matter of example 6, wherein the scene awareness module is to create the dynamic occlusion map by identifying one or more dynamic occluders in the video stream, the one or more dynamic occluders includes real-world objects that have a variable geo-location in the video stream. An example 8 includes the subject matter of any of examples 1-7, wherein the OT node includes a scene awareness module to determine a static occlusion map for the field of view associated with the OT node, and the OT node uses the static occlusion map to create the local track. An example 9 includes the subject matter of example 8, wherein the scene awareness module creates the static occlusion map by identifying one or more static occluders in the video stream, the static occluders includes real-world objects that are determined to have a substantially constant geo-location in the video stream. An example 10 includes the subject matter of any of examples 1-9, wherein the OT node includes a scene awareness module to create static and dynamic masks for static and dynamic occluders, respectively, wherein the static and dynamic occluders are detected in the video stream, and map the static and dynamic masks to the ground plane. An example 11 includes the subject matter of any of examples 1-10, wherein the OT node includes a human detection module to detect a plurality of persons in the field of view including a temporarily and/or partially occluded person, determine a geo-location of the temporarily and/or partially occluded person, and output data indicating the geo-location of the temporarily and/or partially occluded person. An example 12 includes the subject matter of example 11, wherein the human detection module includes a plurality of part-based detectors, each of the part-based detectors is to detect a different part of a human body that is less than a full human body. An example 13 includes the subject matter of example 12, wherein the human detection module includes an occlusion reasoning engine to estimate a position of a body part that is at least partially occluded in an image of the video stream based on relative positions of other body parts that are detected by the part-based detectors. An example 14 includes the subject matter of example 11, wherein the human detection module includes a plurality of part-based detectors, each of the part-based detectors is to generate a detection hypothesis for a different part of a human body, and the human detection module includes an occlusion reasoning engine to reason over the detection hypotheses for the different body parts and generate a detection hypothesis for the full human body of the temporarily and/or partially occluded person. An example 15 includes the subject matter of example 14, wherein the human detection module includes a hypothesis fusion engine to algorithmically predict a spatial arrangement of the temporarily and/or partially occluded person in relation to at least one of the other persons detected in the field of view. An example 16 includes the subject matter of example 11, wherein the human detection module includes a stereo-based human detector to receive a second video stream from a second camera, compute a depth map using images from the video stream and the second video stream, and use the depth map to predict the spatial relationship of the temporarily and/or partially occluded person relative to at least one of the other detected persons. An example 17 includes the subject matter of example 11, wherein the OT node includes a tracking module to initiate and maintain a local track for the temporarily and/or partially occluded person detected in the field of view. An example 18 includes the subject matter of example 17, wherein the tracking module is to feed the local track back to the human detection module for use by the human detection module in analyzing another time instant of the video stream. An example 19 includes the subject matter of example 17, wherein the tracking module includes an occlusion reasoning module to determine whether to suspend or terminate the tracking of the temporarily and/or partially occluded person. An example 20 includes the subject matter of example 19, wherein the occlusion reasoning module defines a personal occlusion zone for at least one of the detected persons and uses the personal occlusion zone to track the temporarily and/or partially occluded person. An example 21 includes the subject matter of example 17, wherein the tracking module includes a reacquisition module to link a suspended or terminated local track for the temporarily and/or partially occluded person with a subsequently-generated local track for the same person. An example 22 includes the subject matter of example 17, wherein the tracking module includes an appearance model to represent the appearance of different body parts of the temporarily and/or partially occluded person by different spatially-encoded color histograms.

In an example 23, an object tracking (OT) node to detect and track at least one person depicted in a video stream produced by a camera having a field of view arranged to acquire images of a real-world environment, where the OT node includes, embodied in one or more computer accessible storage media: a scene awareness module to generate an occlusion map identifying one or more occlusions in a scene in the video stream; a human detection module to (i) use the occlusion map to detect an temporarily and/or partially occluded person in a group of persons detected in the video stream and (ii) determine a spatial relationship of the temporarily and/or partially occluded person relative to at least one of the other detected persons in the group of persons by detecting a plurality of body parts independently of other body parts, each of the detected body parts includes less than a full human body, and algorithmically fusing the different body part detections; and a tracking module to output a local track for the temporarily and/or partially occluded person, the local track includes a unique identifier and the geo-location of the temporarily and/or partially occluded person at different time instants of the video stream.

An example 24 includes the subject matter of example 23, wherein the human detection module includes a plurality of part-based detectors to detect different body parts of a human body. An example 25 includes the subject matter of example 24, wherein the human detection module includes an occlusion reasoning engine to estimate a position of a temporarily and/or partially occluded body part of the temporarily and/or partially occluded person based on the relative positions of the body parts that are detected by the part-based detectors. An example 26 includes the subject matter of any of examples 23-25, wherein the human detection module includes a plurality of part-based detectors, wherein each of the part-based detectors generates a detection hypothesis for a different part of a human body, and the human detection module includes an occlusion reasoning engine to reason over the detection hypotheses for the different body parts to generate a detection hypothesis for the full human body of the temporarily and/or partially occluded person. An example 27 includes the subject matter of example 26, wherein the human detection module includes a hypothesis fusion engine to apply a fusion algorithm to the plurality of detection hypotheses and predict a spatial relationship of the temporarily and/or partially occluded person relative to at least one other person in the group of detected persons. An example 28 includes the subject matter of any of examples 23-27, wherein the human detection module includes a stereo-based human detector to receive a second video stream from a second camera, compute a depth map using images from the video stream and the second video stream, and use the depth map to determine the geo-location of the temporarily and/or partially occluded person in three dimensions. An example 29 includes the subject matter of any of examples 23-28, wherein the OT node is to receive the video stream from at least one camera that is embodied in a mobile consumer electronic device. An example 30 includes the subject matter of example 29, and includes a calibration module to align and geo-localize the video stream produced by the at least one camera embodied in a mobile consumer electronic device in response to movement of the mobile consumer electronic device.

In an example 31, a human detection module to detect and track at least one person depicted in a video stream produced by a camera having a field of view arranged to acquire images of a real-world environment, where the human detection module includes, embodied in one or more computer accessible storage media: a feature computation module to detect a group of persons in the video stream; a part-based human detector to detect a plurality of body parts of one or more persons in the group of detected persons independently of other body parts, the detected body parts each includes less than an entire person; and an occlusion reasoning engine to predict a spatial relationship of the temporarily and/or partially occluded person relative to at least one other person in the group of persons based on the detected body parts.

An example 32 includes the subject matter of example 31, and includes a plurality of part-based detectors, wherein each of the part-based detectors is to generate a detection hypothesis for a different part of a human body, and an occlusion reasoning engine to reason over the detection hypotheses for the different body parts to generate a detection hypothesis for the full human body of the temporarily and/or partially occluded person. An example 33 includes the subject matter of example 32, wherein the part-based detectors are to generate at least two conflicting detection hypotheses, and the human detection module includes a hypothesis fusion engine to algorithmically analyze the at least two conflicting detection hypotheses and output a reconciled detection hypothesis that resolves the at least two conflicting detection hypotheses. An example 34 includes the subject matter of any of examples 31-33, and includes a plurality of part-based detectors, wherein each of the part-based detectors is to generate a detection hypothesis for a different part of a human body, and an occlusion reasoning engine to estimate a position of a temporarily and/or partially occluded body part of the temporarily and/or partially-occluded person based on the relative positions of the body parts that are detected by the part-based detectors. An example 35 includes the subject matter of any of examples 31-34, wherein the feature computation module is to detect multiple people depicted in the video stream, the part-based human detector is to detect multiple instances of a similar body part; and the occlusion reasoning engine is to predict associations of the multiple instances of the similar body part with the detected people. An example 36 includes the subject matter of any of examples 31-35, and includes a plurality of part-based detectors, wherein each of the part-based detectors is to detect a different part of a human body; and the occlusion reasoning engine is to infer a connection between at least two different body parts detected by the part-based detectors. An example 37 includes the subject matter of any of examples 31-36, wherein the human detection module is to detect and track at least one person depicted in a video stream output by a camera that is embodied in a mobile consumer electronic device.

In an example 38, a method for detecting and tracking at least one person depicted in a video stream produced by a camera having a field of view arranged to acquire images of a real-world environment includes, with at least one computing device: detecting a group of persons depicted in the video stream; identifying an temporarily and/or partially occluded person in the group of persons; detecting a body part of a person in the group of persons independently of another body part, the detected body part includes less than an entire person; and predicting a spatial relationship of the temporarily and/or partially occluded person relative to at least one other person in the group of persons based on the detected body part.

An example 39 includes the subject matter of example 38, and includes detecting a plurality of different body parts and predicting a geo-location for the full body of the temporarily and/or partially occluded person based on the relative positions of the detected body parts. An example 40 includes the subject matter of example 38 or 39, and includes generating a plurality of different detection hypotheses for different body parts detected in the video stream, and generating a detection hypothesis for the full body of the temporarily and/or partially occluded person by reasoning over the plurality of different detection hypotheses. An example 41 includes the subject matter of any of examples 38-40, and includes detecting multiple instances of a similar body part in the video stream and predicting associations of the similar body parts with one or more of the persons in the group of persons. An example 42 includes the subject matter of any of examples 38-41, and includes detecting a plurality of different human body parts of different people depicted in the video stream; and inferring a connection of at least two of the detected different body parts to the same person. An example 43 includes a method includes receiving a plurality of different video streams from a plurality of different cameras embodied in different mobile consumer electronic devices, performing the method of any of examples 38-42 on each of the different video streams, and creating a global track based on the plurality of different video streams.

In an example 44, a method for detecting and tracking a person or object includes, with at least one computing device, algorithmically analyzing aerial imagery to: identify a motion pattern in the aerial imagery; extract a multi-scale intrinsic motion structure (MIMS) feature from the motion pattern; and use the MIMS feature to detect a person or object. An example 45 includes the subject matter of example 44, wherein the MIMS feature encodes a plurality of intrinsic motion properties of a person or object that are location-invariant, velocity-invariant, and trajectory shape-invariant. An example 46 includes the subject matter of example 44 or 45, and includes predicting the detection of the person or object based on a plurality of previously-generated motion models.

GENERAL CONSIDERATIONS

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, blocks, and the like are referred to as such for ease of discussion, and are not intended to imply that any specific implementation details are required. For example, any of the described modules and/or data structures may be combined or divided into sub-modules, sub-processes or other units of computer code or data as may be required by a particular design or implementation. In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure. This disclosure is to be considered as exemplary and not restrictive in character, and all changes and modifications that come within the spirit of the disclosure are desired to be protected.

The invention claimed is:

1. A real-time object detection and tracking system comprising, embodied in one or more computer accessible storage media:
an object tracking (OT) node to detect and track one or more objects in a group of objects depicted in a video stream produced by a camera having a field of view arranged to acquire images of a real-world environment, by:
detecting a plurality of parts of objects in the group of objects, each of the detected parts being less than an entire object;
identifying one or more occlusions depicted in the video stream;
inferring a spatial relationship between at least two of the objects in the group of objects based on the detected parts and the identified occlusions; and
outputting a local track for one or more of the objects in the group of objects, the local track comprising a unique identifier and a geo-location of one or more of the objects at different time instants of the video stream.

2. The system of claim 1, wherein the OT node infers a spatial relationship between a temporarily and/or partially occluded object of the group of objects and at least one other object in the group of objects based on the detected parts and the identified occlusions.

3. The system of claim 1, comprising a plurality of OT nodes each associated with a field of view of a different camera of a plurality of cameras arranged in the real-world environment, wherein each of the OT nodes is to output a local track for a different field of view, and an OT manager to create a global track by fusing the local tracks output by the OT nodes.

4. The system of claim 3, wherein at least two of the cameras have non-overlapping fields of view and the OT manager is to determine if a local track associated with one of the non-overlapping fields of view is a continuation of a local track associated with another of the non-overlapping fields of view.

5. The system of claim 3, wherein at least one of the cameras is embodied in a mobile consumer electronic device, and the mobile consumer electronic device is to transmit the video stream to the OT node by a communication network.

6. The system of claim 1, wherein the OT node comprises a scene awareness module to determine a dynamic occlusion map for the field of view associated with the OT node, and the OT node uses the dynamic occlusion map to create the local track.

7. The system of claim 6, wherein the scene awareness module is to create the dynamic occlusion map by identifying one or more dynamic occluders in the video stream, the one or more dynamic occluders comprising real-world objects that have a variable geo-location in the video stream.

8. The system of claim 1, wherein the OT node comprises a scene awareness module to determine a static occlusion map for the field of view associated with the OT node, and the OT node uses the static occlusion map to create the local track.

9. The system of claim 8, wherein the scene awareness module creates the static occlusion map by identifying one or more static occluders in the video stream, the static occluders comprising real-world objects that are determined to have a substantially constant geo-location in the video stream.

10. The system of claim 1, wherein the OT node comprises a scene awareness module to create static and dynamic masks for static and dynamic occluders, respectively, wherein the static and dynamic occluders are detected in the video stream, and map the static and dynamic masks to the ground plane.

11. The system of claim 1, wherein the OT node comprises a human detection module to detect a plurality of persons in the field of view including a temporarily and/or partially occluded person, determine a geo-location of the temporarily and/or partially occluded person, and output data indicating the geo-location of the temporarily and/or partially occluded person.

12. The system of claim 11, wherein the human detection module comprises a plurality of part-based detectors, each of the part-based detectors is to detect a different part of a human body that is less than a full human body.

13. The system of claim 12, wherein the human detection module comprises an occlusion reasoning engine to estimate a position of a body part that is at least partially occluded in an image of the video stream based on relative positions of other body parts that are detected by the part-based detectors.

14. The system of claim 11, wherein the human detection module comprises a plurality of part-based detectors, each of the part-based detectors is to generate a detection hypothesis for a different part of a human body, and the human detection module comprises an occlusion reasoning engine to reason over the detection hypotheses for the different body parts and generate a detection hypothesis for the full human body of the temporarily and/or partially occluded person.

15. The system of claim 14, wherein the human detection module comprises a hypothesis fusion engine to algorithmically predict a spatial arrangement of the temporarily and/or partially occluded person in relation to at least one of the other persons detected in the field of view.

16. The system of claim 11, wherein the human detection module comprises a stereo-based human detector to receive a second video stream from a second camera, compute a depth map using images from the video stream and the second video stream, and use the depth map to predict the spatial relationship of the temporarily and/or partially occluded person relative to at least one of the other detected persons.

17. The system of claim 11, wherein the OT node comprises a tracking module to initiate and maintain a local track for the temporarily and/or partially occluded person detected in the field of view.

18. The system of claim 17, wherein the tracking module is to feed the local track back to the human detection module for use by the human detection module in analyzing another time instant of the video stream.

19. The system of claim 17, wherein the tracking module comprises an occlusion reasoning module to determine whether to suspend or terminate the tracking of the temporarily and/or partially occluded person.

20. The system of claim 19, wherein the occlusion reasoning module defines a personal occlusion zone for at least one of the detected persons and uses the personal occlusion zone to track the temporarily and/or partially occluded person.

21. The system of claim 17, wherein the tracking module comprises a reacquisition module to link a suspended or terminated local track for the temporarily and/or partially occluded person with a subsequently-generated local track for the same person.

22. The system of claim 17, wherein the tracking module comprises an appearance model to represent the appearance of different body parts of the temporarily and/or partially occluded person by different spatially-encoded color histograms.

23. An object tracking (OT) node to detect and track at least one person depicted in a video stream produced by a camera having a field of view arranged to acquire images of a real-world environment, the OT node comprising, embodied in one or more computer accessible storage media:
a scene awareness module to generate an occlusion map identifying one or more occlusions in a scene in the video stream;
a human detection module to (i) use the occlusion map to detect a temporarily and/or partially occluded person in a group of persons detected in the video stream and (ii) determine a spatial relationship of the temporarily and/or partially occluded person relative to at least one of the other detected persons in the group of persons by using the occlusion map and detecting a plurality of body parts independently of other body parts, each of the detected body parts comprising less than a full human body, and algorithmically fusing the different body part detections; and
a tracking module to output a local track for the temporarily and/or partially occluded person, the local track comprising a unique identifier and the geo-location of the temporarily and/or partially occluded person at different time instants of the video stream.

24. The OT node of claim 23, wherein the human detection module comprises a plurality of part-based detectors to detect different body parts of a human body.

25. The OT node of claim 24, wherein the human detection module comprises an occlusion reasoning engine to estimate a position of an at least temporarily at least partially occluded body part of the temporarily and/or partially occluded person based on the relative positions of the body parts that are detected by the part-based detectors.

26. The OT node of claim 23, wherein the human detection module comprises a plurality of part-based detectors, wherein each of the part-based detectors generates a detection hypothesis for a different part of a human body, and the human detection module comprises an occlusion reasoning engine to reason over the detection hypotheses for the different body parts to generate a detection hypothesis for the full human body of the temporarily and/or partially occluded person.

27. The OT node of claim 26, wherein the human detection module comprises a hypothesis fusion engine to apply a fusion algorithm to the plurality of detection hypotheses and predict a spatial relationship of the temporarily and/or partially occluded person relative to at least one other person in the group of detected persons.

28. The OT node of claim 23, wherein the human detection module comprises a stereo-based human detector to receive a second video stream from a second camera, compute a depth map using images from the video stream and the second video stream, and use the depth map to determine the geo-location of the temporarily and/or partially occluded person in three dimensions.

29. The OT node of claim 23, wherein the OT node is to receive the video stream from at least one camera that is embodied in a mobile consumer electronic device.

30. The OT node of claim 29, comprising a calibration module to align and geo-localize the video stream produced by the at least one camera embodied in a mobile consumer electronic device in response to movement of the mobile consumer electronic device.

31. A human detection module to detect and track at least one person depicted in a video stream produced by a camera having a field of view arranged to acquire images of a real-world environment, the human detection module comprising, embodied in one or more computer accessible storage media:
a feature computation module to detect a group of persons including a temporarily and/or partially occluded person;
a part-based human detector to detect a plurality of body parts of one or more persons in the group of detected persons independently of other body parts, the detected body parts each comprising less than an entire person; and
an occlusion reasoning engine to predict a spatial relationship of the temporarily and/or partially occluded person relative to at least one other person in the group of persons based on the detected body parts and occlusion information of the detected temporarily and/or partially occluded person.

32. The human detection module of claim 31, comprising a plurality of part-based detectors, wherein each of the part-based detectors is to generate a detection hypothesis for a different part of a human body, and an occlusion reasoning engine to reason over the detection hypotheses for the different body parts to generate a detection hypothesis for the full human body of the temporarily and/or partially occluded person.

33. The human detection module of claim 32, wherein the part-based detectors are to generate at least two conflicting detection hypotheses, and the human detection module comprises a hypothesis fusion engine to algorithmically analyze the at least two conflicting detection hypotheses and output a reconciled detection hypothesis that resolves the at least two conflicting detection hypotheses.

34. The human detection module of claim 31, comprising a plurality of part-based detectors, wherein each of the part-based detectors is to generate a detection hypothesis for a different part of a human body, and an occlusion reasoning engine to estimate a position of a temporarily and/or partially occluded body part of the temporarily and/or partially occluded person based on the relative positions of the body parts that are detected by the part-based detectors.

35. The human detection module of claim 31, wherein the feature computation module is to detect multiple people depicted in the video stream, the part-based human detector is to detect multiple instances of a similar body part; and the occlusion reasoning engine is to predict associations of the multiple instances of the similar body part with the detected people.

36. The human detection module of claim 31, comprising a plurality of part-based detectors, wherein each of the part-based detectors is to detect a different part of a human body; and the occlusion reasoning engine is to infer a connection between at least two different body parts detected by the part-based detectors.

37. The human detection module of claim 31, wherein the human detection module is to detect and track at least one person depicted in a video stream output by a camera that is embodied in a mobile consumer electronic device.

38. A method for detecting and tracking at least one person depicted in a video stream produced by a camera having a field of view arranged to acquire images of a real-world environment, the method comprising, with at least one computing device:
   detecting a group of persons depicted in the video stream;
   identifying a temporarily and/or partially occluded person in the group of persons;
   detecting a body part of a person in the group of persons independently of another body part, the detected body part comprising less than an entire person; and
   predicting a spatial relationship of the temporarily and/or partially occluded person relative to at least one other person in the group of persons based on the detected body part and occlusion information of the identified temporarily and/or partially occluded person.

39. The method of claim 38, comprising detecting a plurality of different body parts and predicting a geo-location for the full body of the temporarily and/or partially occluded person based on the relative positions of the detected body parts.

40. The method of claim 38, comprising generating a plurality of different detection hypotheses for different body parts detected in the video stream, and generating a detection hypothesis for the full body of the temporarily and/or partially occluded person by reasoning over the plurality of different detection hypotheses.

41. The method of claim 38, comprising detecting multiple instances of a similar body part in the video stream and predicting associations of the similar body parts with one or more of the persons in the group of persons.

42. The method of claim 38, comprising detecting a plurality of different human body parts of different people depicted in the video stream; and inferring a connection of at least two of the detected different body parts to the same person.

43. A method comprising receiving a plurality of different video streams from a plurality of different cameras embodied in different mobile consumer electronic devices, performing the method of claim 38 on each of the different video streams, and creating a global track based on the plurality of different video streams.

* * * * *